United States Patent
Basu et al.

(10) Patent No.: US 7,596,618 B2
(45) Date of Patent: Sep. 29, 2009

(54) SPLITTING A WORKLOAD OF A NODE

(75) Inventors: Sujoy Basu, Menlo Park, CA (US); Sujata Banerjee, Sunnyvale, CA (US); Puneet Sharma, Palo Alto, CA (US); Sung-Ju Lee, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 811 days.

(21) Appl. No.: 11/006,061

(22) Filed: Dec. 7, 2004

(65) Prior Publication Data

US 2006/0120411 A1    Jun. 8, 2006

(51) Int. Cl.
G06F 9/46 (2006.01)
G06F 15/173 (2006.01)
H04W 72/00 (2009.01)

(52) U.S. Cl. .................. 709/226; 718/105; 455/453

(58) Field of Classification Search ............... 455/453, 455/454; 370/318, 329, 330, 341, 395.2, 370/395.21, 395.4, 468; 726/23, 1, 26, 25, 726/24; 709/219, 226, 224, 235
See application file for complete search history.

(56) References Cited

U.S. PATENT DOCUMENTS

| | | | | |
|---|---|---|---|---|
| 6,389,448 | B1 * | 5/2002 | Primak et al. | 718/105 |
| 6,691,165 | B1 * | 2/2004 | Bruck et al. | 709/227 |
| 6,820,262 | B1 | 11/2004 | Tellez et al. | |
| 6,965,930 | B1 * | 11/2005 | Arrowood et al. | 709/223 |
| 7,197,573 | B1 | 3/2007 | Jacobson et al. | |
| 7,296,268 | B2 * | 11/2007 | Darling et al. | 718/105 |
| 7,353,538 | B2 * | 4/2008 | Sample | 726/23 |
| 7,389,510 | B2 * | 6/2008 | Forrester | 718/105 |
| 2002/0059451 | A1 | 5/2002 | Haviv | |
| 2002/0107962 | A1 | 8/2002 | Richter et al. | |
| 2002/0178261 | A1 | 11/2002 | Chang | |
| 2003/0110291 | A1 | 6/2003 | Chen | |
| 2004/0143842 | A1 | 7/2004 | Joshi | |
| 2005/0047420 | A1 | 3/2005 | Tanabe et al. | |
| 2005/0268102 | A1 | 12/2005 | Downey | |

OTHER PUBLICATIONS

Andrezejak, A. et al., "Scalabe, Efficient Range Queries for Grid Information Services", HP Labs Technical Report HPL-2002-209, Jul. 2002.
Balazinska, M. et al, "Twine: A Scalabe Peer-to-Peer Architecture for Intentional Resource Discovery", Lecture Notes in Computer Science, 2002.
Czajkowski, K. et al., "Grid Information Services for Distributed Resource Sharing", Proc. 10th IEEE International Symposium on High Performance Distributed Computing, 2001.
Ganesan, P. et al., "One Torus to Rule Them All: Multi-Dimensional Quereis in P2P Systems", Stanford University; 2004.
Iamnitchi, A. et al., "A Peer-to-Peer Approach to Resource Location in Grid Environments", Univ. of Chicago Technical Report TR-2002-06.

(Continued)

Primary Examiner—Hanh Nguyen

(57) ABSTRACT

A node is identified from a set of nodes in a peer-to-peer network having the highest workloads in the peer-to-peer network. The workload of the node is split with another node using a splitting algorithm.

29 Claims, 19 Drawing Sheets

OTHER PUBLICATIONS

Oppenheimer, D. et al. "Scalabe Wide-Area Resource Discovery", Univ. of California, Berkely, San Diego; downloaded 2004.

http://www.cs.berkely.edu/~davidopp/sword/; downloaded 2004.

* cited by examiner

130b        ATTRIBUTE SUBSPACE

MEMORY > 1 GB     RESPONSE TIME < 20ms
DISK > 5 GB

| LEVEL | IP ADDRESS | PROBABILITY | ATTRIBUTE RANGE |
|---|---|---|---|
| 0 | 130a | 1.0 | MEMORY ≤ 1GB |
| 1 | 130c | 1.0 | DISK SPACE ≤ 2GB |
| 1 | 130c | 0.5 | DISK SPACE ≤ 5GB |
| 2 | 130d | 1.0 | RESPONSE TIME ≥ 20ms |

130d        ATTRIBUTE SUBSPACE

MEMORY > 1 GB     RESPONSE TIME ≥ 20ms
DISK > 5 GB

| LEVEL | IP ADDRESS | PROBABILITY | ATTRIBUTE RANGE |
|---|---|---|---|
| 0 | 130a | 1.0 | MEMORY ≤ 1GB |
| 1 | 130c | 1.0 | DISK SPACE ≤ 2GB |
| 1 | 130c | 0.5 | DISK SPACE ≤ 5GB |
| 2 | 130b | 1.0 | RESPONSE TIME < 20ms |

*FIG. 9C*

SPLITTING A WORKLOAD OF A NODE

TECHNICAL FIELD

This invention relates generally to networks. More particularly, the invention relates to splitting workloads of nodes in a network.

BACKGROUND

Large networks, such as the Internet, which may provide the infrastructure for many peer-to-peer systems, are now being used to provide a variety of services to users. For example, media services, such as streaming and transcoding, web-services for e-commerce, such as airline and hotel reservations, or grid computing services for computation and data may be available via large networks.

A fundamental challenge in effectively utilizing these network services is to efficiently and quickly locate desired services in large networks, such as the Internet. The challenge of discovering services is complicated by several factors. For example, if a centralized information service for facilitating such discovery were used, such as a centralized information service used for peer-to-peer file sharing systems, it would not easily scale as the number of available services and number of users increases. In addition, each service has several dynamic attributes, e.g., load and latency, that keep changing and need to be updated in the information service. The desired update rate may not be sustained by a centralized information service. Also, providing an information service with minimal downtime may require several system administrators to maintain and would be costly. Finally, the information service should be locality-aware for faster response times. For example, a query including a request for a desired service should be directed to a node in the network proximity of the node initially sending the query, and the services returned as a response to the query should also be in the network proximity of the querying node.

In addition, if an information service were made available, the information service should include self-managing properties, such as workload balancing and other administration tasks, for minimizing costly, manual administration prone to error.

SUMMARY

According to an embodiment, A node is identified from a set of nodes in a peer-to-peer network having the highest workloads in the peer-to-peer network. The workload of the node is split with another node using a splitting algorithm.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIGS. 9A-C illustrate examples of routing tables and attribute subspaces resulting from workload splitting, according to an embodiment;

DETAILED DESCRIPTION OF THE EMBODIMENTS

Figure 1:
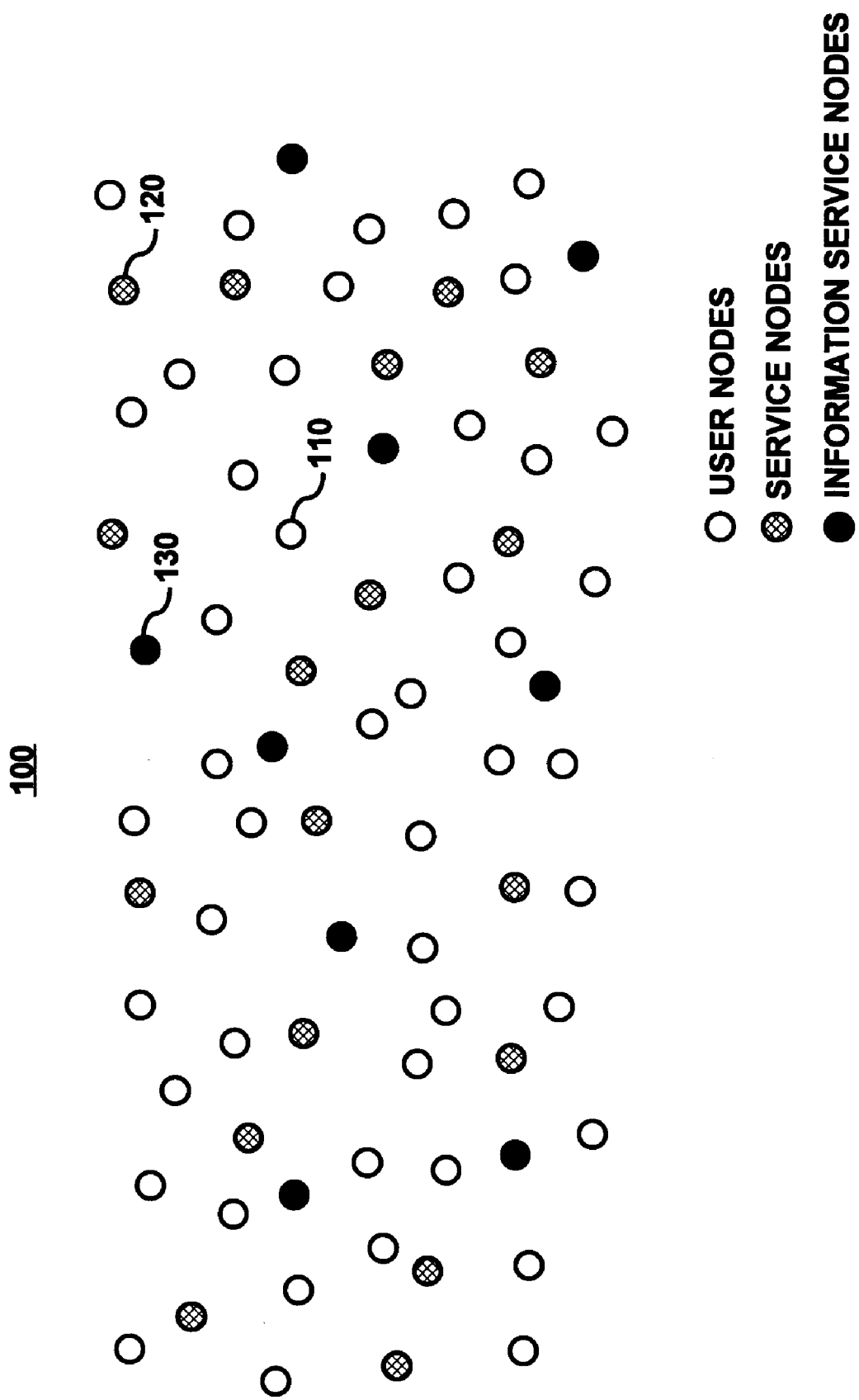
FIG. 1 illustrates a peer-to-peer network, according to an embodiment.

For simplicity and illustrative purposes, the principles of the embodiments are described. However, one of ordinary skill in the art would readily recognize that the same principles are equally applicable to, and can be implemented in, all types of network systems, and that any such variations do not depart from the true spirit and scope of the embodiments. Moreover, in the following detailed description, references are made to the accompanying figures, which illustrate specific embodiments. Electrical, mechanical, logical and structural changes may be made to the embodiments without departing from the spirit and scope of the embodiments.

According to an embodiment, a distributed information service is provided for discovering services in a network. The information service provides users with information about services available via the network. A user queries the information service for information about desired services available via the network. The information service may respond with a list of service nodes in the network that are operable to provide the desired service.

The information service is a distributed information service including a plurality of information service nodes in a peer-to-peer network storing information about the available services. Unlike conventional peer-to-peer networks where the nodes tend to be transient, the information service nodes are stable nodes in a peer-to-peer architecture that are more likely to remain in the peer-to-peer network for an extended period of time rather than joining the peer-to-peer network for a short period of time. It will be apparent to one of ordinary skill in the art that the peer-to-peer network is one example of organizing the information service nodes in a distributed architecture and any type of distributed architecture may be used.

The distributed nature of the information service minimizes the bottleneck associated with using a conventional, central information repository that handles all queries for information, and thus improves query response times. An overlay network for the peer-to-peer network is used to efficiently route queries and information about services in the distributed information service for facilitating the discovery of available services in a network.

A service as used herein refers to any function that operates on an input and produces an output. Examples of services include transcoding, language translation, encryption, image repair and analysis, error correction, converting content into different languages, etc. Also, a service may be composed of multiple services. For example, an output of one service may be the input of another service, and so on for as many intermediate services that are used to compose the service. An example of a composed service may include a media service including a video streaming service input into a transcoding service such that a user may receive streaming video in a format viewable on a particular end-user device.

Other types of services include computation services, data storage services, and grid computing services, which may encompass sharing of computer resources. A grid computing service, for example, allows users access to computing services based on specifications, such as application requirements.

1. System Overview

FIG. 1 illustrates a network 100 including user nodes 110, service nodes 120, and information service nodes 130. An example of the network 100 includes a large-scale network, such as the Internet, where services are made available to users. However, the embodiments may be implemented in smaller networks providing services. User nodes include any node operable to receive a service. Typically, a user node submits a query to an information service for determining whether a service desired by a user is available in the network 100, and if the service is available, which service node to contact for receiving the service. The service nodes 120 include nodes operable to provide services. After a user node identifies a service node operable to provide a desired service by querying the information service, the user node receives the service from the service node providing the desired service. A node is any device that may send and/or receive messages via the network and that is typically operable to perform some type of data processing. Examples of nodes include routers, servers, and end-user devices, such as PDA's, personal computers, laptops, and cellular phones.

The information service, according to an embodiment, is provided by the information service nodes 130. The information service nodes 130 allow for the discovery of services in the network 100. In addition to service discovery, the information service nodes 130 balance workloads among themselves using several techniques described in copending U.S. patent application Ser. No. 11/006,068 entitled "Determining Highest Workloads For Nodes In A Network" by Sujoy Basu et al., which is incorporated by reference in its entirety.

As described above, the information service including the information service nodes 130 perform functions associated with the discovery of services in the network 100. Two important functions include the storing of information about available services and responding to queries about available services. The information service nodes 130 are provided in a peer-to-peer network 200, shown in FIG. 2, in the network 100. The peer-to-peer network 200 and an overlay network 210 for the peer-to-peer network 200 are used for, among other things, storing information about services in the information service nodes 130, for routing among the information service nodes 130, and for responding to queries.

Figure 2:
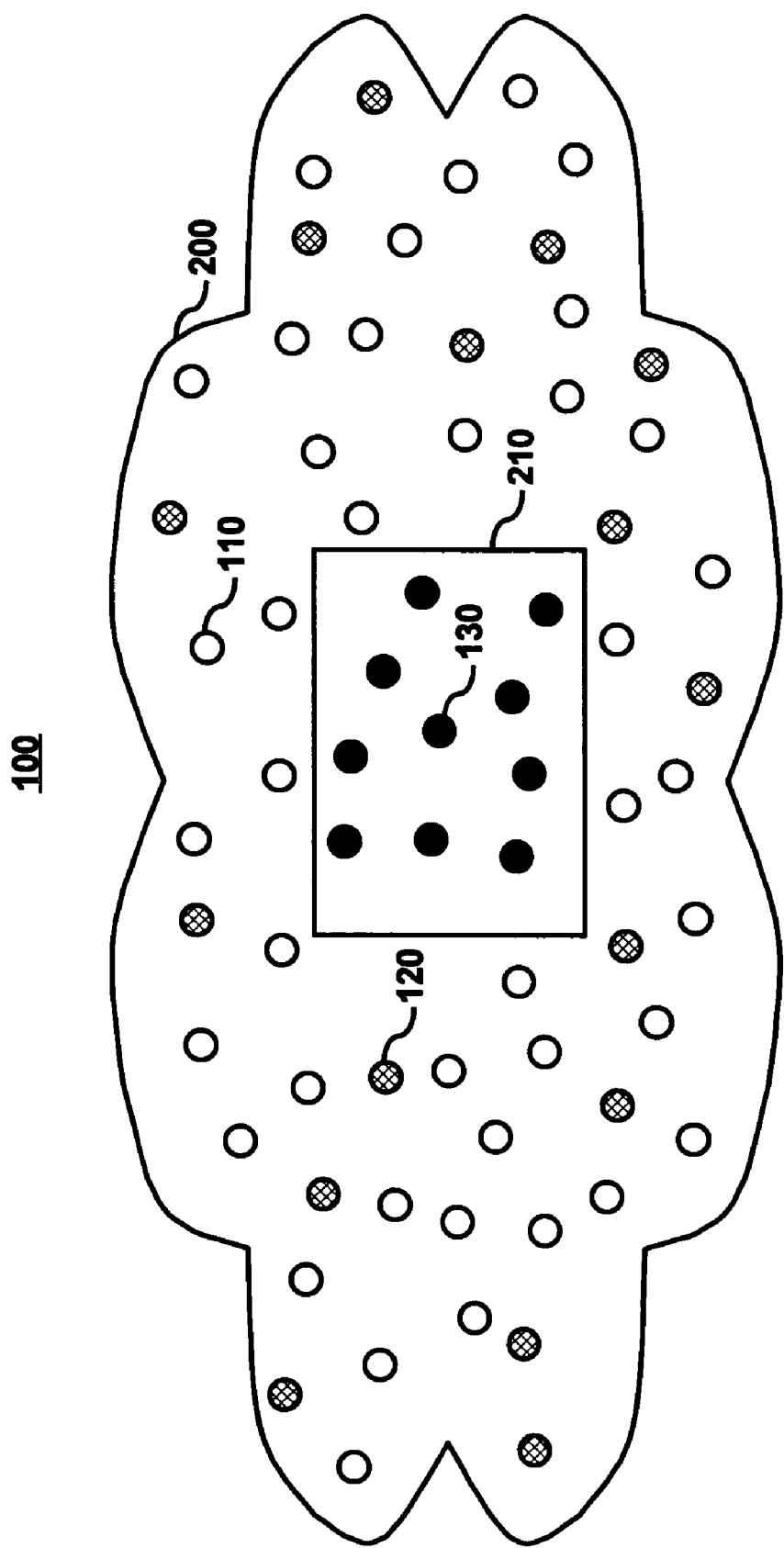
FIG. 2 illustrates an overlay network in the peer-to-peer network, according to an embodiment.

As shown in FIG. 2, the overlay network 210 overlays the underlying peer-to-peer network 200. The overlay network 210 is a logical representation of the peer-to-peer network 200 and is operable to efficiently route queries and service information based on attributes and attribute ranges used to define services, as described in detail below. FIG. 2 illustrates the information service nodes 130 centrally located in the network 100 and the user nodes 110 and the service nodes 120 provided around the overlay network 210 for purposes of illustrating that the peer-to-peer network 200 includes the information service nodes 130 and that the user nodes 110 and the service nodes 120 communicate with the information service nodes 130 in the peer-to-peer network 200 as needed. The information service nodes 130 may be provided in several different areas of the network 100 to minimize latency, e.g., the length of time it takes a user node to get a response to a query response.

2. The Attribute Space and Attribute Subspaces

A service is characterized by specifying values for various service attributes. For example, a computing service may be characterized by the values of attributes, such as operating system and applications, amount of physical memory, disk space, and network bandwidth.

The information service tracks these attributes and attribute values. Each information service node has the responsibility for tracking a certain set of values for one or more of the attributes. The combination of the sets of attribute values for all the tracked attributes forms the attribute subspace tracked by that information service node.

Figure 3:
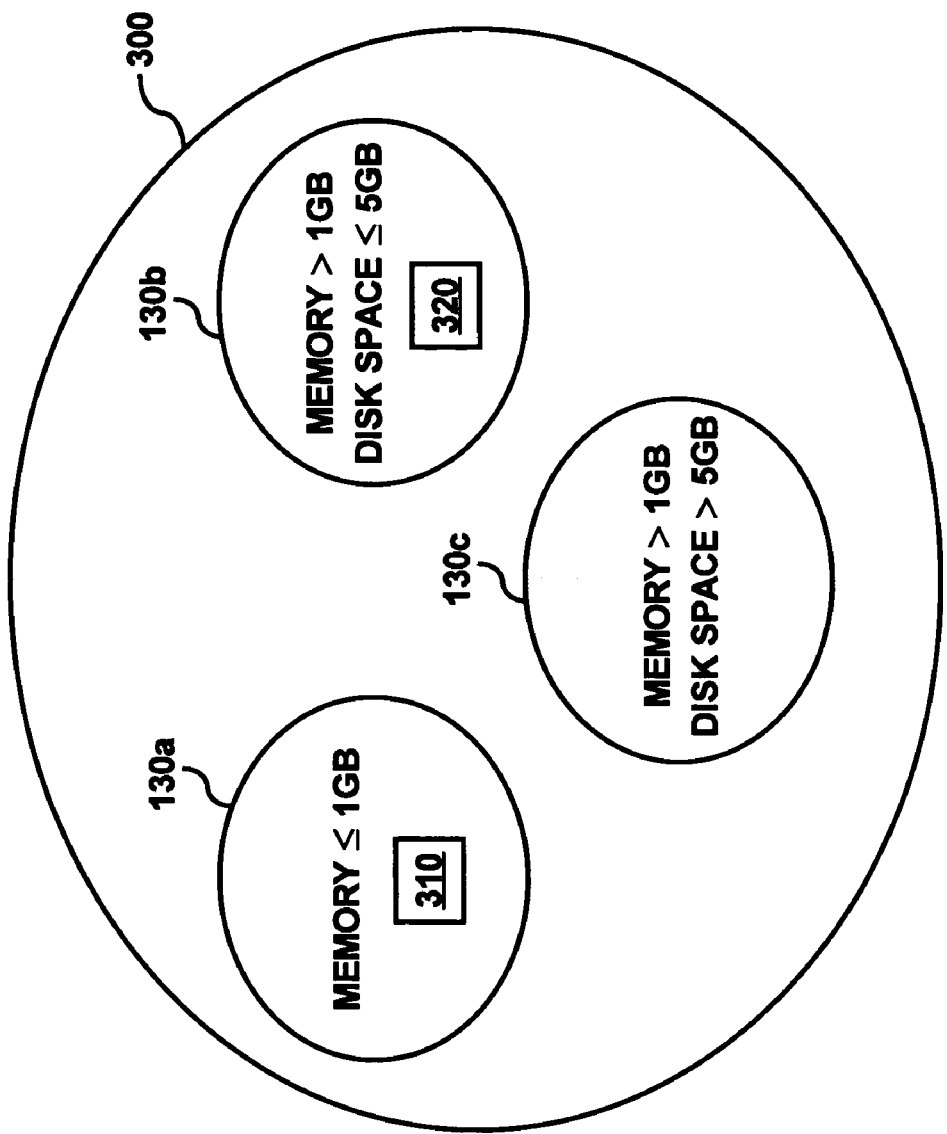
FIG. 3 illustrates an attribute space and attribute subspaces, according to an embodiment.

The information service, comprised of the information service nodes 130, includes an attribute space 300 shown in FIG. 3. The attribute space 300 includes all the information about available services in the peer-to-peer network 100. The attribute space 300 is a logical representation of the information stored in the information service.

The attribute space 300 is distributed among the information service nodes 130. Only three information service nodes 130a-c are shown in FIG. 3 for purposes of illustration. Each of the information service nodes 130 is assigned responsibility for an attribute subspace in the attribute space 300. Each attribute subspace is associated with particular attributes and attribute values. In the information service, a service is defined by predetermined attributes and attribute values that vary by service. Attributes and attribute values are assigned to each of the information service nodes 130. A service is determined to fall within an attribute subspace of an information service node, and thus information about that service is ultimately stored in that information service node, if the attributes and attribute values for the service match the attributes and attribute values assigned to the attribute subspace for the information service node. For example, an attribute subspace may include attribute values for a particular attribute. If a service is defined using one or more attribute values that intersect the attribute values of an attribute subspace, the service may fall within the attribute subspace. An example further describing the attribute subspaces is as follows. A list of predetermined attributes for defining all the services in the network 100 may include memory, disk space, average load, operating system, applications, service uptime, and response time. A grid computing service may include the sharing of computer resources. A grid computing service, e.g., grid computing service 1, may be defined based on the computer resources that can be shared. Grid computing service 1 is defined using the following attribute values:

Table 1 of Attributes and Attribute Values for Grid Computing Service 1

Memory: 1 GB
    Disk Space: 2.5-5 GB
    Operating System: Linux 2.4
    Average Load: 0
    Applications: Maya, Renderman
    Service Uptime: 99.5%
    Response Time: <=20 ms As shown in FIG. 3, the information service node 130a is assigned the attribute subspace defined by the attribute values of memory<=1 GB. An advertisement 310 for the grid computing service 1, which includes the attribute values in Table 1, is stored at the information service node 130a because the information service node 130a stores all advertisements having a memory attribute value<=1 GB.

An advertisement includes the attributes and attribute values used to define a particular service. A predetermined set of attributes may be used to define all services in the network 100. Each of the service nodes 120 measures or otherwise determines the attribute values for each of the attributes in the predetermined set of attributes. Each of the service nodes 120 also periodically sends their advertisements to the information service. The overlay network 210 automatically routes the advertisements to the appropriate information service node owning the attribute subspace where the advertisement falls. The attributes and attribute values shown above for the grid computing service 1 is an example of the information in the advertisement 130 for the grid computing service 1. For example, a service node providing the grid computing service 1 periodically measures or otherwise determines the attribute values for the grid computing service 1 shown in Table 1 and transmits the advertisement 310 including the attribute values to the overlay network 210 for storage in the information service node owning the attribute subspace where the advertisement falls. In the example shown in FIG. 3, the information service nodes 130 routed an advertisement 310 for the grid computing service 1 to the information service node 130a, because the information service node 130a stores all the information about services, transmitted to the overlay network 210, having an attribute value within memory<=1 GB. That is the grid computing service 1 is defined using an attribute value of 1 GB for the memory=attribute, and the 1 GB attribute value intersects, i.e., is included in the attribute range of memory<=1 GB for the attribute subspace of the information service node 130a. Thus, the grid computing service 1 falls within the attribute subspace of the information service node 130a.

The attributes shown above for the grid computing service 1 are examples of the predetermined set of attributes used to define services in the network 100. It will be apparent to one of ordinary skill in the art that other attributes may be used to define the available services. Also, a predetermined set of attributes may be used to define the services. However, each service may have different attribute values, which are periodically measured and stored in the information service node having the corresponding attribute subspace.

Queries are similarly stored in the peer-to-peer network 200. For example, the overlay network 210 shown in FIG. 2 may receive a query 320 shown in FIG. 3 including a request for a service with an attribute of memory>1 GB and disk space=2 GB. The query 320 falls in the attribute subspace owned by the information service node 130b. Thus, the query 320 is routed through the overlay network 210 to the information service node 130b. The query 320 is automatically routed to and stored in the information service node 130b, and the information service node 130b responds to the query by searching the advertisements stored in the information service node 130b and sending any matches to the node requesting the service.

The overlay network 210, including the attribute space 300, supports range queries. Range queries include one or more attribute ranges that identify a desired service. The information service nodes 130, using the overlay network 210, are operable to route range queries to an attribute subspace including the range of attribute values or an attribute subspace intersecting the range of attribute values in the query. In addition, the query may include multiple attribute ranges, and the query may be routed to more than one information service node having an attribute subspace including or intersecting an attribute range.

3. Information Service Node

Figure 4:
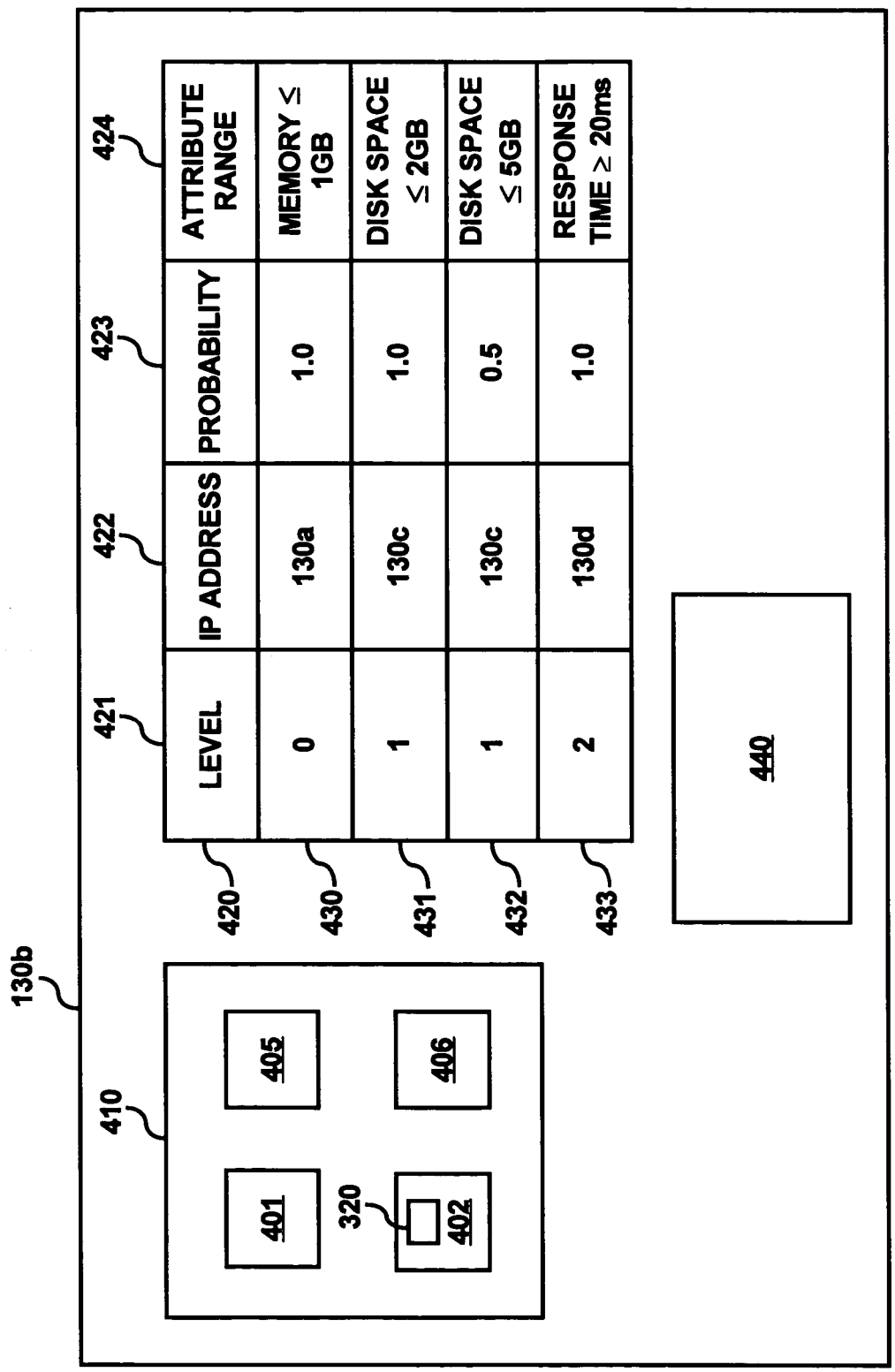
FIG. 4 illustrates information stored in an information service node, according to an embodiment.

FIG. 4 illustrates an example of some of the information stored in an information service node, such as the information service node 130b. The information service node 130b includes a storage cache 410, an overlay routing table 420, and a replica location cache 440. The storage cache 410 stores local queries 401 and global queries 402. The storage cache 410 also stores local advertisements 405 and global advertisements 406. The global queries 402 include queries that are routed through the overlay network 210 to the information service node 130b, because the queries fall in the attribute subspace owned by the information storage node 130b. The query 320 shown in FIG. 3 is an example of a global query.

The local queries 401 include any query received by the information service node 130b. For example, the information service node 130a may receive a query and forward the query towards its destination in the overlay network 210, which may include the information service node owning the attribute subspace where the query falls. Before forwarding the query toward its destination, the query is locally cached in the storage cache 410. Also, the information service node 130b, before forwarding the query towards its destination, searches the local advertisements 405 stored in the storage cache 410 to determine whether any matches to the query are found. If a match is found, the information service node 130b responds to the query, for example, by sending the matching advertisement to the node requesting the service and the associated service node. The information service node 130b may continue to route the query toward its destination, because the destination may include advertisements for services matching the query that are provided by service nodes closer to the node requesting the service. Alternatively, the information service node 130b may not forward the query if a match is locally cached.

The global advertisements 406 include advertisements that are routed through the overlay network 210 to the information service node 130b, because the advertisements fall in the attribute subspace owned by the information storage node 130b. The advertisement 310 shown in FIG. 3 is an example of a global advertisement for the information service node 130a.

The local advertisements 405 include any advertisement received by the information service node 130a. For example, the information service node 130a may receive an advertisement and forward the advertisement towards its destination. These advertisements are locally cached in the storage cache 410 and may be searched to provide faster response times for queries if matches are found in the local cache.

The information service node 130b also includes the overlay routing table 420. The overlay routing table 420 includes the following fields: level 421, IP address 422, probability 423, and attribute range 424. The level 421 is generally associated with the number of times the information service node 130b has split its workload with another information service node. When the information service node 130b splits its workload with another information service node, a new entry in the routing table in the information service node 130b is created at a level greater than the existing highest level in the routing table. For example, the entries 431 and 432 were created at level 1 when the information service node 130b split its workload with the information service node 130c. The entry 433 was created at level 2 when the information service node 130b subsequently split its workload with the information service node 130d. Workload splitting may be performed when a determination is made that an information service node has a high workload in comparison to other information service nodes in the overlay network 210. The probabilities 423 indicates the probability that an information service node will have the desired data. For example, the entry 430 indicates that the information service node 130a always stores advertisements with memory<=1 GB, and the entry 431 indicates that the information service node 130c always stores advertisements with disk space<=2 GB. However, the information service node 130c has a 50% probability of storing advertisements with disk space<=5 GB. Generating the entries in the routing tables and the probabilities are described in further detail in the U.S. patent applications incorporated by reference above.

The IP address field 422 in the routing table 420 is for identifying the destination of an information service node in a particular entry. For example, if the information service node 130b receives an advertisement and determines the advertisement has a memory attribute<1 GB, the information service node 130b uses the entry 430 to route the advertisement to its next destination, e.g., the information service node 130a. The IP address of the information service node 130a may be provided in the IP address field of the entry 430, and the information service node 130b uses IP routing to transmit the message to the information service node 130a in the network 200.

The replica location cache 440 stores information associated with the number of times each service node is contacted and latencies for the service nodes that have been contacted. A replica is a copy of an information service node. For example, an information service node may be duplicated at a new location in the network 100 if it is determined that the original information service node has been contacted frequently by user nodes in one area of the network 100 and/or user nodes receiving messages, such as responses to queries, from the original information service node have been experiencing high latencies to the information service node. The information service node 130b may use the information in the replica location cache 440 to determine whether to add a replica in another area of the network 100 to reduce latency.

4. Routing

Figure 5:
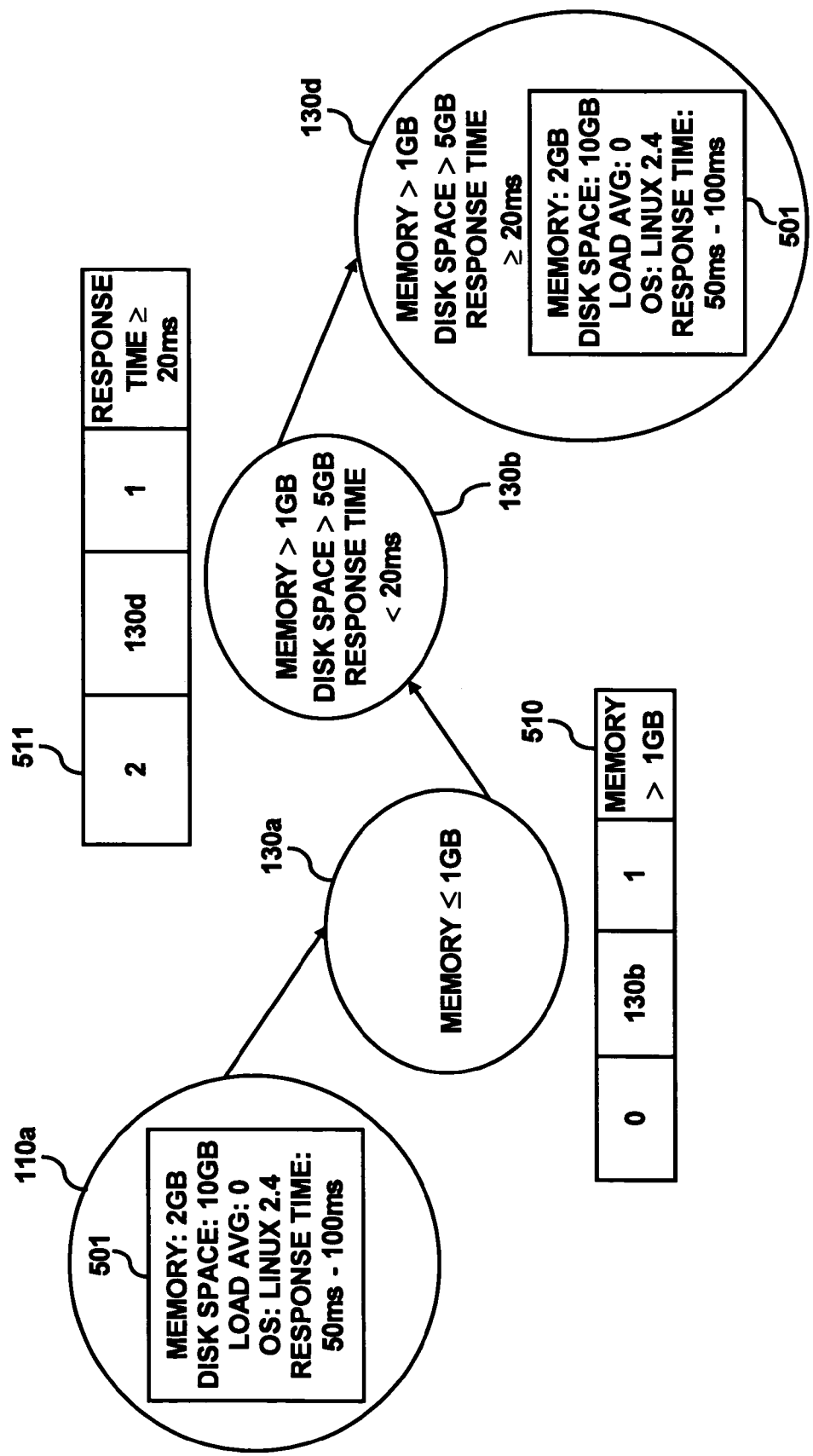
FIG. 5 illustrates routing a query, according to an embodiment.

FIG. 5 illustrates an example of routing a query 501 in the overlay network 210. A user node 10a transmits the query 501 to an information service node, e.g., the information service node 130a, in the overlay network 210. In one example, the information service node that the user node 110a makes initial contact with in the overlay network 210 may be selected based on network proximity. For example, during an initialization step when the user node 110a joins the peer-to-peer network 100, the user node 110a receives a message from an information service node indicating the IP address of the information service node in close network proximity to the user node 110a. An example of determining location information for nodes using distances measured based on a network metric, such as latency, number of hops, etc. is described in U.S. patent application Ser. No. 10/767,285, filed Jan. 30, 2004, and entitled "Selecting Nodes Close To Another Node In A Network Using Location Information For The Nodes" by Zhichen Xu et al., which is assigned to the assignee of the present application. The location information is used to determine network proximity to other nodes in the network and can be used to select a closest information service node. Other techniques for determining distances and location information for nodes in a network may also be used.

After the user node 110a identifies an information service node in close proximity, e.g., the information service node 130a, the user node 110b transmits the query 501 to the information service node 130a. The query 501 includes attribute values defining a service desired by the user node 110a. The attribute values may be a range or a single value. In this example, the query 501 includes the following attribute values:

| Table 2 of the Attributes and Attribute Values for the Query 501 |
|---|
| Memory: 2 GB |
| Disk Space: 10 GB |
| Operating System: Linux 2.4 |
| Response Time: 50-100 ms |

The information service node 130a receives the query 501. The attribute subspace for the information service node 130a includes memory<=1 GB. The query 501 includes an attribute value of 2 GB for memory. The 2 GB attribute value is not included in the attribute range of memory<=1 GB for the attribute subspace of the information service node 130a, and thus the query 501 does not fall in the attribute subspace of the information service node 130a.

The information service node 130a identifies an information service node from its routing table that includes the attribute values of the query 501. For example, the information service node 130a starts with the lowest level entry, e.g., level 0, and searches its routing table for an entry including attribute values that intersect the attribute values in the query 501. An entry 510 is shown which includes: level 0, IP address for the information service node 130b, probability of 1, and memory>1 GB. Based on the entry 510, the information service node 130a transmits the query 501 to the information service node 130b. The attribute subspace for the information service node 130b includes response time<20 ms which is not included in the response time range of 50-100 ms specified in the query 501. Thus, the information service node 130d searches its routing table and finds, for example, the entry 511. The entry 511 identifies the information service node 130d and the query 501 is transmitted to the information service node 130d. The information service node 130d has an attribute subspace including the attribute values of the query 501, and thus the query 501 falls in that attribute subspace. The information service node 130a determines whether any advertisements stored in its global cache satisfy the query. For example, a service may need to have all the attribute values specified in the query 501 for it to be considered a match. If a match is found, the information service node 130a responds to the query 501 by sending the advertisement, including, for example, the IP address of the service node providing the service, to the user node 110a. The information service node 130a may also send a message to the service node for the advertisement, along with the IP address of the user node 110a, indicating that the user node 110a is requesting the service described in the advertisement. The query 501 is also stored in the global cache of the information service node 130c.

The information service nodes 130a and 130b may store a copy of the query 501 in its local cache before forwarding the query 501. Also, the information service nodes 130a and 130b may determine whether any advertisements stored in its local cache satisfy the query 501 before forwarding the query. If a match is found, the information service node 130a may respond to the query 501 by sending the advertisement, including, for example, the IP address of the service node providing the service, to the user node 110a. The information service node 130a may also send a message to the service node providing the service described in the advertisement, along with the IP address of the user node 10a, indicating that the user node 110a is requesting the service in the advertisement.

In the example described above with respect to FIG. 5, the query 501 is routed to the information service node 130d because the query 501 falls in the attribute subspace of the information service node 130d. The query 501 may continue to be routed to other information service nodes that may include advertisements matching the query 501. For example, another information service node may include the following attribute subspace: memory>1 GB, disk space>5 GB, response time>=20 ms, and operating system including Linux 1.0-2.5. The information service node 130d may route the query 501 to the information service node including the attribute subspace described above, because the query 501 also falls in that attribute subspace. Thus, the user node 110a may receive search results from multiple information service nodes, including information service nodes finding matches in their local caches, and the user node 110a may select a service node for receiving the desired service.

In addition, it should be noted that the overlay network 210 supports range queries. The query 501 includes a range of attribute value, 50-100 ms, for the attribute response time. The query 501 may include one or more ranges, and is routed to information service nodes intersecting the range. For example, the query 501 may be routed to an attribute subspace including any of the attribute values 50-100 ms.

Figure 6:
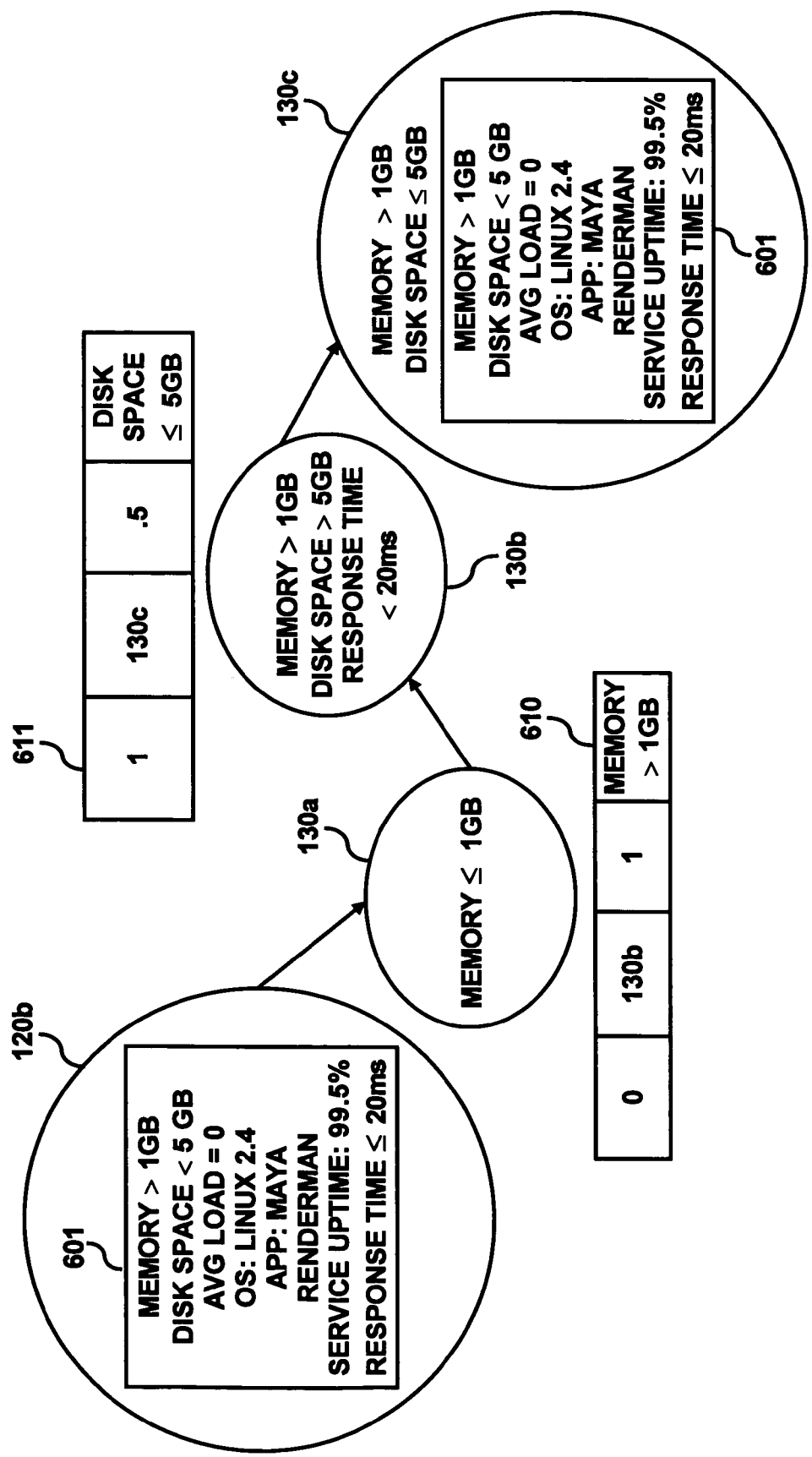
FIG. 6 illustrates routing an advertisement, according to an embodiment.

FIG. 6 illustrates routing an advertisement 601 in the overlay network 210. Advertisements are routed similarly to queries in the overlay network 210. The service nodes 120 periodically measure their attributes and transmit their advertisements including the measured attributes to the overlay network 210. Each advertisement may include an attribute value or a range of attribute values for each attribute in a predetermined set of attributes. An example of a predetermined set of attributes includes memory, disk space, operating system, average load of a service node providing a service, applications, service uptime, and response time of an information service node providing a service.

FIG. 6 illustrates an advertisement 601 generated by the service node 120b. The advertisement 601 includes the following:

Table 3 of Attribute Values for the Advertisement 601

Memory: 1 GB
Disk Space: 2.5-5 GB
Operating System: Linux 2.4

-continued

Table 3 of Attribute Values for the Advertisement 601

Average Load: 0
Applications: Maya, Renderman
Service Uptime: 99.5%
Response Time: <=20 ms The service node 120b may transmit the advertisement 601 to the information service node 130a, because, for example, the information service node 130a is in close proximity to the service node 120b. The advertisement 601 does not fall in the attribute subspace owned by the information service node 130a, because the advertisement 601 has memory>1 GB and the attribute subspace for the information service node 130a includes memory<=1 GB. Thus, the information service node 130a identifies the information service node 130b from an entry 610 in its routing table. For example, the information service node 130b starts with the lowest level entry and searches its routing table for an entry including attribute values that intersect attribute values in the advertisement 601. The entry 610 identifies the information service node 130b and the advertisement 601 is transmitted to the information service node 130b. The advertisement 601 does not fall in the attribute subspace owned by the information service node 130b, because the disk space in the advertisement 601 is less than or equal to 5 GB. The information service node 130b identifies the information service node 130c from an entry 611 in its routing table that includes the attribute value of disk space<=5 GB. The advertisement 601 falls in the attribute subspace of the information service node 130c and is stored at the information service node 130c. Prior to forwarding the advertisement 601, the information service nodes 130a and 130b store the advertisement 601 in its local cache. In addition, the information service node 130c may copy the advertisement 601 for storage in its global cache and forward the advertisement 601 to other information service nodes including attribute subspaces where the advertisement 601 falls.

4. Distributed Algorithm for Identifying Top K Nodes

Workload is periodically measured by each of the information service nodes 130 in the overlay network 210 shown in FIG. 2. Workload may be calculated from one or more metrics including, but not limited to, the number of advertisements stored, the number of queries processed, the average latency of processing a query, throughput, e.g., queries processed per second, etc.

At the beginning of each epoch, the information service nodes 130 participate in an exchange phase. Each epoch may include a period of time when an exchange phase and/or a dissemination phase are performed. An epoch counter or the time of the beginning of the next epoch may be included in the top K list. The epoch counter or the time of the beginning of the next epoch may be used by an information service node to determine whether a list received by the information service node is for the current epoch. During the exchange phase, a list of top K nodes is routed up a service tree comprised of the information service nodes 130. At the top of the service tree is a leader node, which may be a pre-selected information service node.

Figure 7:
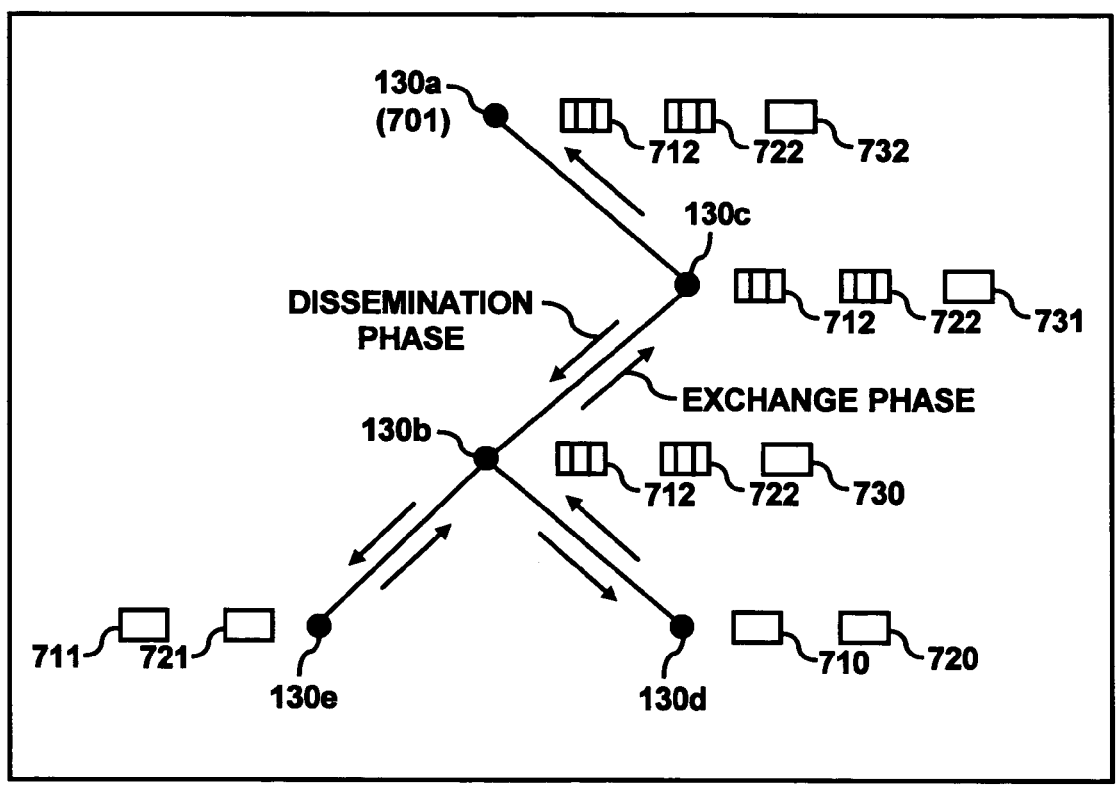
FIG. 7 illustrates an exchange phase and a dissemination phase, according to an embodiment.

A top K list, including the highest workloads measured by the information service nodes 130 in the overlay network 210, is routed through each of the information service nodes 130 in the overlay network 210 to a leader node 710 shown in FIG. 7. As the top K list is routed through each of the information service nodes 130, each information service node compares its measured workload to other workloads in the top K list. If a workload of an information service node receiving the top K list is greater than another workload in the top K list, the information service node includes its workload in the top K list, possibly replacing the smaller workload. The top K list may include a predetermined number of workloads, K. Thus, if the top K list includes less than K workloads, the information service node includes its workload in the top K list. Also, the top K list may initially be comprised of several top K lists. For example, each leaf of a service tree including the information service nodes 130 may originate a top K list. The top K lists may be combined at information service nodes receiving several top K lists. Eventually, the leader node 710 compiles a single top K list.

In addition to the top K list, an L min level vector and a highest routing table value in the overlay network are propagated through the overly network 210. The min level vector includes an L number of minimum routing table levels in the overlay network 210. As the min level vector is routed through each of the information service nodes 130, each information service node compares the highest level of its routing table to other values in the min level vector. If the highest level in the routing table of an information service node receiving the min level vector is smaller than another value in the min level vector, the information service node includes its highest level in the min level vector, possibly replacing the larger value. The min level vector may include a predetermined number of values, L. Thus, if the min level vector includes less than L values, the information service node includes its highest level in the min level vector. Also, the min level vector may initially be comprised of several min level vectors. For example, each leaf of a service tree including the information service nodes 130 may originate a min level vector. The min level vectors may be combined at information service nodes receiving several min level vectors. Eventually, the leader node 701 compiles a single min level vector including L number of values.

The highest level of the routing table in the information service nodes 130 in the overlay network 210, is also routed through each of the information service nodes 130 in the overlay network 210 to the same leader node 701 shown in FIG. 7. As the highest level is routed through each of the information service nodes 130, each information service node compares the highest level of its routing table to the received value. If the highest level in the routing table of the information service node is larger than the received value, the information service node replaces the received value with its own. Each leaf of a service tree including the information service nodes 130 will originate its highest level. These values may be combined at information service nodes receiving several highest level values. Eventually, the leader node 701 compiles a single highest level. The highest routing table level may be included in the L min level vector for convenience and transmitted through the overlay network with the L min level vector.

During the exchange phase, each of the information service nodes 130 includes an identifier in the top K list, such as an IP address, as the top K list is routed to the leader node 701. The identifier is included even if the information service node receiving the top K list does not include its workload in the top K list. In a dissemination phase, the top K list is transmitted down the service tree through each of the information service nodes 130 using the identifiers. For example, the top K list is transmitted to each of the information service nodes 130 in the reverse order from which each information service node received the top K list. Also, when a new information service node joins the information service, in addition to generating a routing table and storing advertisements and queries in the global caches for the new information service node, the new information service node receives the top K list including workloads measured in the last epoch.

The exchange and dissemination phases are further illustrated with respect to FIG. 7. FIG. 7 illustrates a portion of a service tree including the information service nodes 130*a-d* in the overlay network 210. The leader node 701 is the information service node 130*a*. During the exchange phase, the information service nodes 130*a-d* measure their workloads. The top K list of workloads is transmitted up the service tree from the leaves, e.g., information service nodes 130*d* and 130*e* to the leader node 701.

The information service nodes 130 generate workload vectors for the top K list and min level vectors for estimating how skewed the service tree is or how balanced the service tree is. The min level vectors may be used to select an information service node for workload splitting while attempting to maintain a balanced service tree. For example, the difference between the highest (maximum) routing table level in the overlay network 210 and a minimum value in the min level vector is compared to a threshold. If the difference is greater than a threshold, then an information service node having the minimum value may be selected for workload splitting in an attempt to maintain a balanced service tree. Thus, the comparison of the difference between the highest (maximum) routing table level in the overlay network 210 and the minimum value in the min level vector to a threshold is one example of estimating how skewed the service tree is or how balanced the service tree is. Based on this estimation, an information service node may be selected for workload splitting to balance the service tree.

As shown in FIG. 7, the information service nodes 130*d* and 130*e* measure their workloads and generate the workload vectors 710 and 711 respectively. The workload vectors in the overlay network 210 including the K highest workloads are combined to form the top K list. Each workload vector includes at least the identification of the information service node and the measured workload. The information service nodes 130*d* and 130*e* also generate min level vectors 720 and 721 respectively. The min level vectors include the highest level in the routing table for the information service node. Examples of highest levels for the information service nodes 130*a-d* are shown in FIGS. 8A-D and include 0, 2, 1, and 2, respectively. The min level vectors are used to form a K min level list including the K lowest levels in the overlay network 210. The K min level list also includes an information service node ID and routing table level for the information service node having the highest level in the overlay network 210.

Several top K lists may be exchanged during the exchange phase and combined at intermediate nodes, such as the information service node 130*b*. For example, the workload vectors 710 and 711 are top K lists transmitted to the information service node 130*b*. Assuming that K is three, the information service node 130*b* combines the workload vectors 710 and 711 and its own workload vector into the top K list 712. The top K list 712 is transmitted towards the leader node 701 and may include the workloads of the information service nodes 130*c* and/or 130*a* if their workloads are higher than the workloads in the top K list 712 received by each information service node.

Also, during the exchange phase, the min level vectors 720 and 721 are transmitted to the information service node 130*b*. The information service node 130*b* combines the min level vectors 720 and 721 and its own min level vector into the K min level list 722. The K min level list is transmitted towards the leader node 701 and may include the highest routing table levels for information service nodes 130c and/or 130a if their levels are less than the levels in K min level list. In addition, the K min level list includes the service node having the highest level in the overlay network 210. The difference between the maximum level and the level of an information service node initially selected for workload splitting may be compared to a threshold to determine whether the initially selected information service node remains the selection for workload splitting. This comparison is one technique for maintaining a balanced service tree.

Also, during the exchange phase, the order of the information service nodes receiving the top K list is stored at the information service nodded 130 such that top K list may be disseminated to all the information service nodes during the dissemination phase. For example, order information 730 includes identifications, such as IP addresses, of the information service nodes 130e and 130d, such that the information service node 130b transmits the top K list 712 to the information service nodes 130e and 130d during the dissemination phase. Other examples of order information include order information 731 at the information service node 130c, such as the IP address of the information service node 130b, and order information 732 at the information service node 130a, such as the IP address of the information service node 130c. Thus, during the dissemination phase, the top K list 712 is transmitted down the service tree to all the information service nodes 130. The K min level list is also transmitted down the service tree during the dissemination phase.

A top K routing algorithm is used for determining which information service node to transmit the top K list to based on the routing table in the information service node transmitting the top K list. For example, FIGS. 8A-D illustrate the routing tables for the information service nodes 130a-d. To route the top K list to the leader node, an information service node receiving the top K list transmits the top K list to the maximum level in its routing table which is responsible for the range below a corresponding splitting value. The information in the top K list identifies the top K nodes and their workloads known so far as the top K list is routed to the leader node. For example, referring to the routing table for the information service node 130d in the FIG. 8D, the highest or maximum level is in the entry 840 with a level of 2. The entry 840 includes an attribute splitting value of 20 ms for the response time attribute. The range for response time includes: response time<=20 ms. Because the range is below the corresponding splitting value, i.e., less than the 20 ms splitting value, the node 130b is identified as the next node for receiving the top K list. The node 130d transmits the top K list to the node 130b.

Figure 8A:
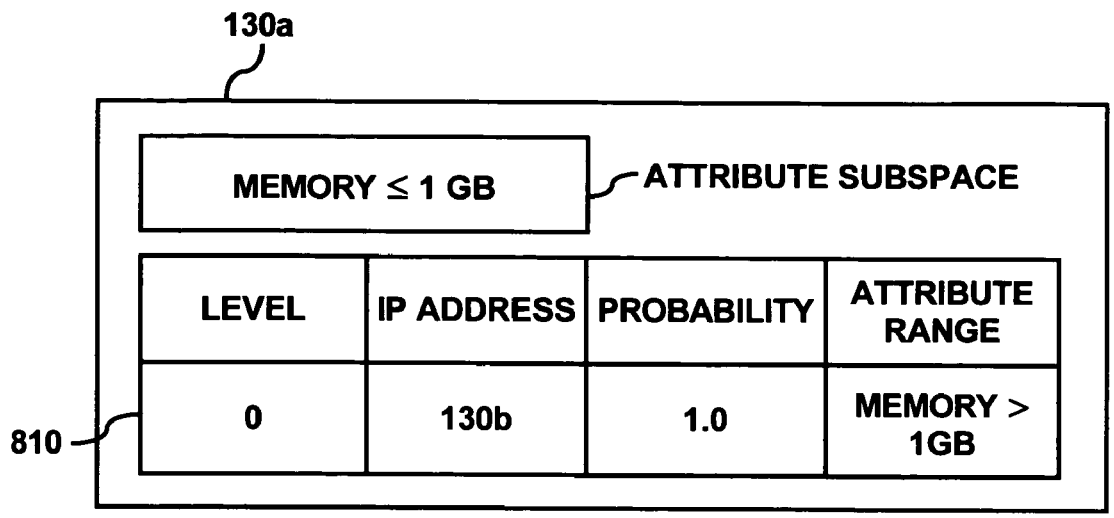
FIGS. 8A-D illustrate routing tables for information service nodes, according to an embodiment.
Figure 8B:
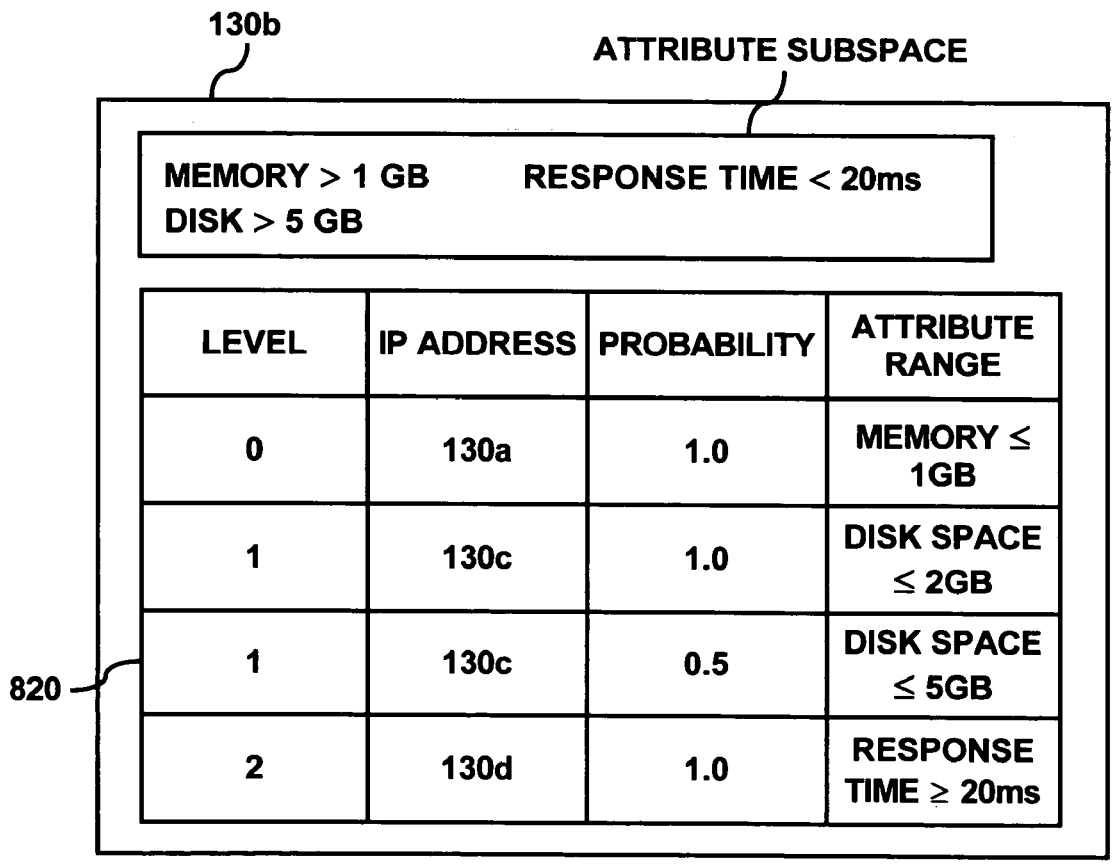

The information service node 130b receives the top K list and based on the top K routing algorithm uses the entry 820 of the routing table for the information service node 130b shown in FIG. 8b to identify the information service node 130c as the next information service node to receive the top K list. The information service node 130b includes its workload in the top K list and transmits the top K list to the information service node 130c.

In this example, the value of K=3. Also, the information service node 130c receives the workloads of the information service nodes 130b, 130d, and 130e, such as shown in FIG. 7. If the workload of the information service node 130c is less than the workloads of the information service nodes 130b, 130d, and 130e, then the information service node 130c does not include its workload in the top K list. The entry 830 of the routing table for the information service node 130c identifies the information service node 130a as the next node for receiving the top K list based on the top K routing algorithm. The information service node 130a determines whether its workload is greater than the three workloads in the top K list. If so, the information service node 130a includes its workload in the top K list. Also, the information service node 130a is the leader node. The leader node is the information service node with only attribute ranges greater than a corresponding splitting value in its routing table. The routing table for the information service node 130a shown in FIG. 8A includes one entry 810. The entry 810 includes an attribute range greater than the corresponding splitting value of 1 GB. Thus, the routing table of the information service node 130a only includes attribute ranges greater than a corresponding splitting value and the information service node 130a is the leader node. In contrast, the routing tables of the information service nodes 130b-d include at least one attribute range less than a corresponding splitting value, such as the entries 820, 830, and 840.

After the leader node receives the top K list, the dissemination phase begins. As shown in FIG. 7, the leader node, e.g., the information service node 130a, transmits the top K list to the information service node 130c. The top K list is eventually disseminated to all the information service nodes, for example, in the reverse order from which the information service nodes previously received the top K list as it was routed up the service tree towards the leader node.

The top K list includes a list of K highest workloads in the overlay network 210. A list as used herein includes a data representation of one or more values that can be transmitted between nodes. For example, the top K list includes values for the largest workloads in the overlay network 210. These values are transmitted between the information service nodes 130. In addition to including workloads, the top K list includes an identifier of the information service node having the workload in the top K list. One example of an identifier is an IP address but other identifiers may be used.

5. Splitting Algorithms

Figure 8C:
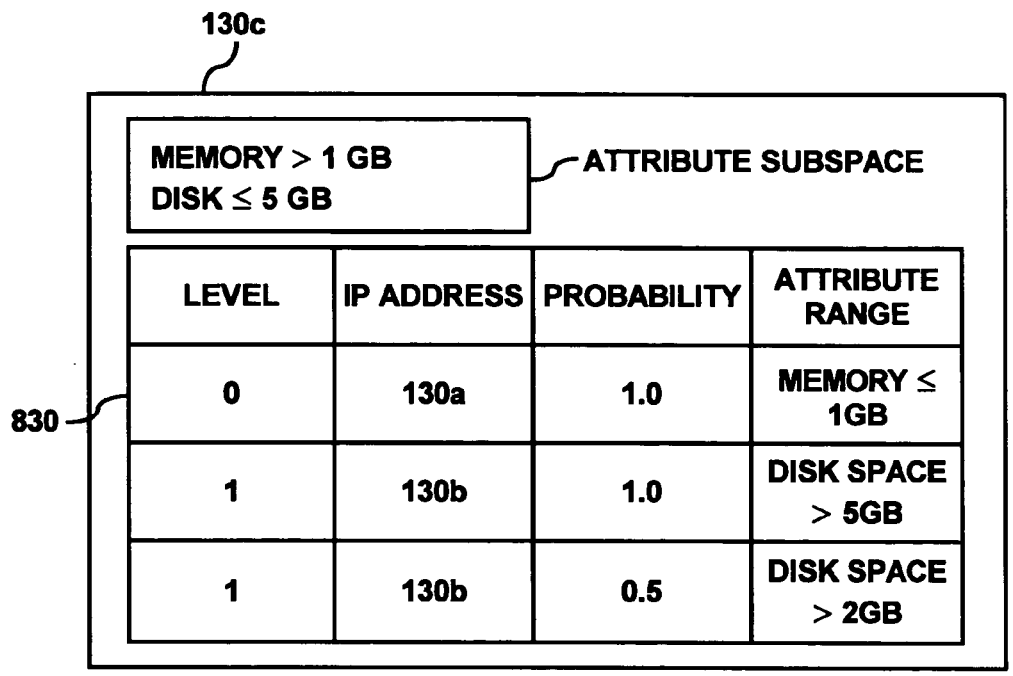
Figure 8D:
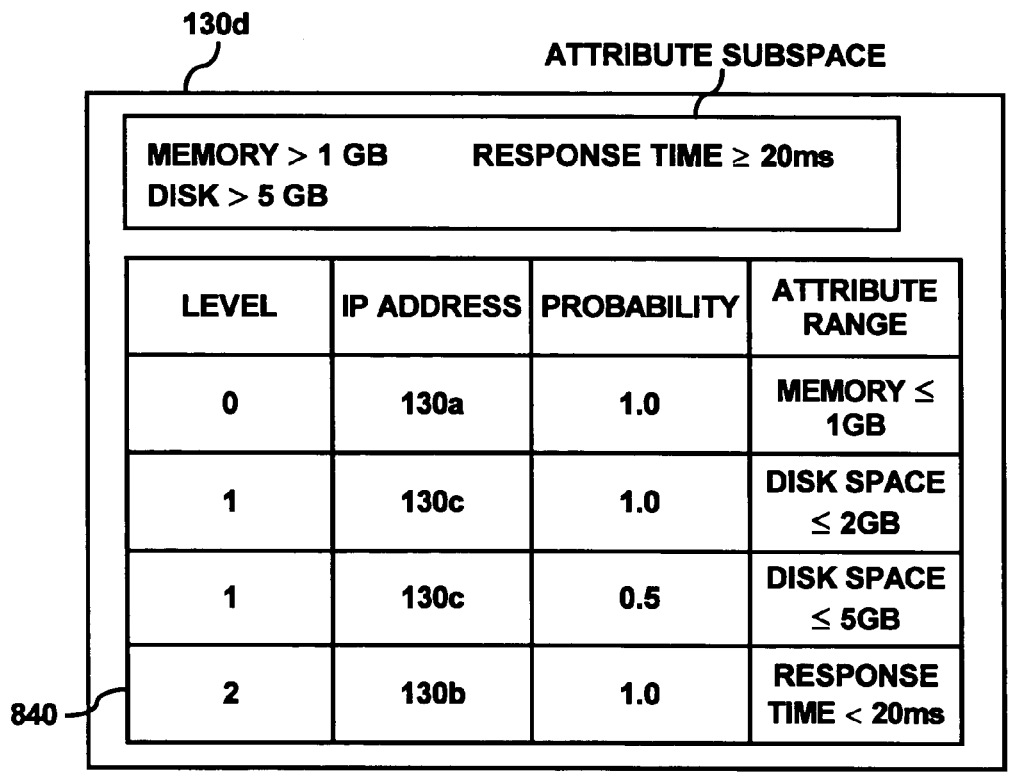

The routing tables shown in FIGS. 8B-D may be generated based on splitting algorithms used to balance workloads for the information service nodes. One type of splitting algorithm is a local splitting algorithm used to split the workload of an information service node, such as an information service node in the top K list having a high workload. The workload of the information service node may be split with another information service node, such as a new information service node joining the overlay network 210 or an existing information service node.

The local splitting algorithm is used to identify an attribute and at least one attribute splitting value for splitting the workload of an information service node. Each advertisement may include a predetermined set of attributes and possibly attribute values for each attribute in the set of attributes. An example of an advertisement including the set of attributes and corresponding attribute values is shown above in table 3. The local splitting algorithm is used to select an attribute from the set of attributes and at least one attribute splitting value for the selected attribute to split the workload of an information service node.

Figure 9A:
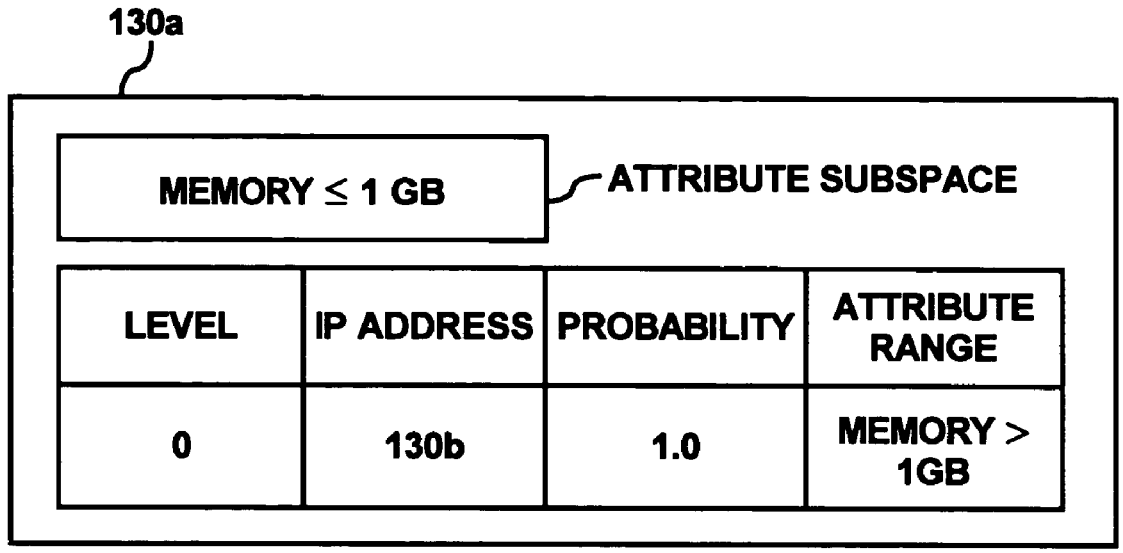
Figure 9A:
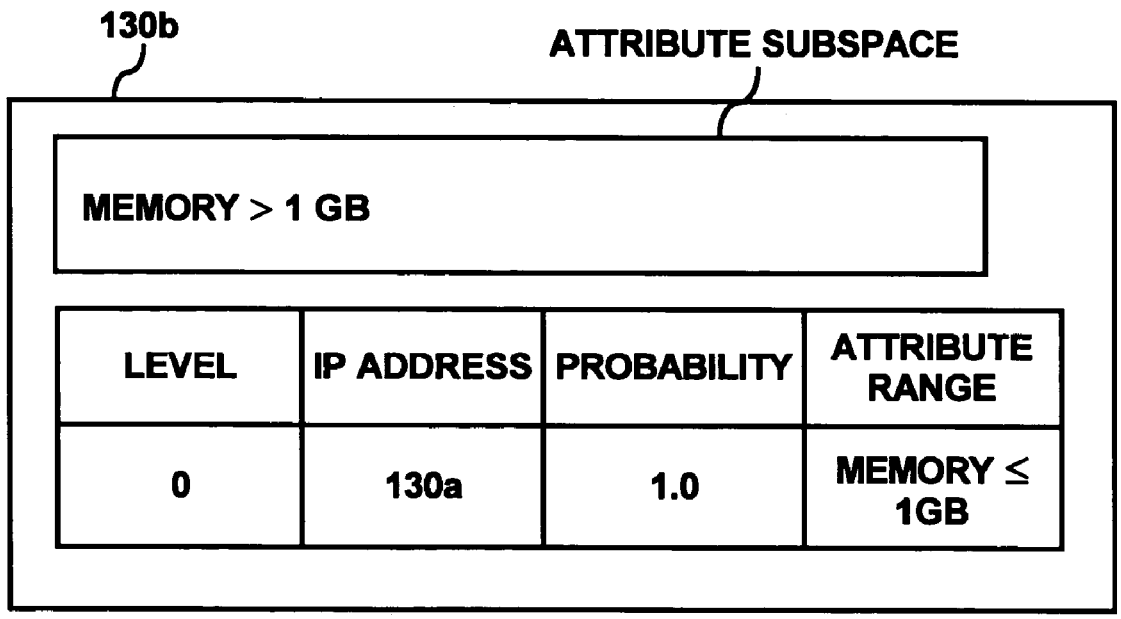
Figure 9B:
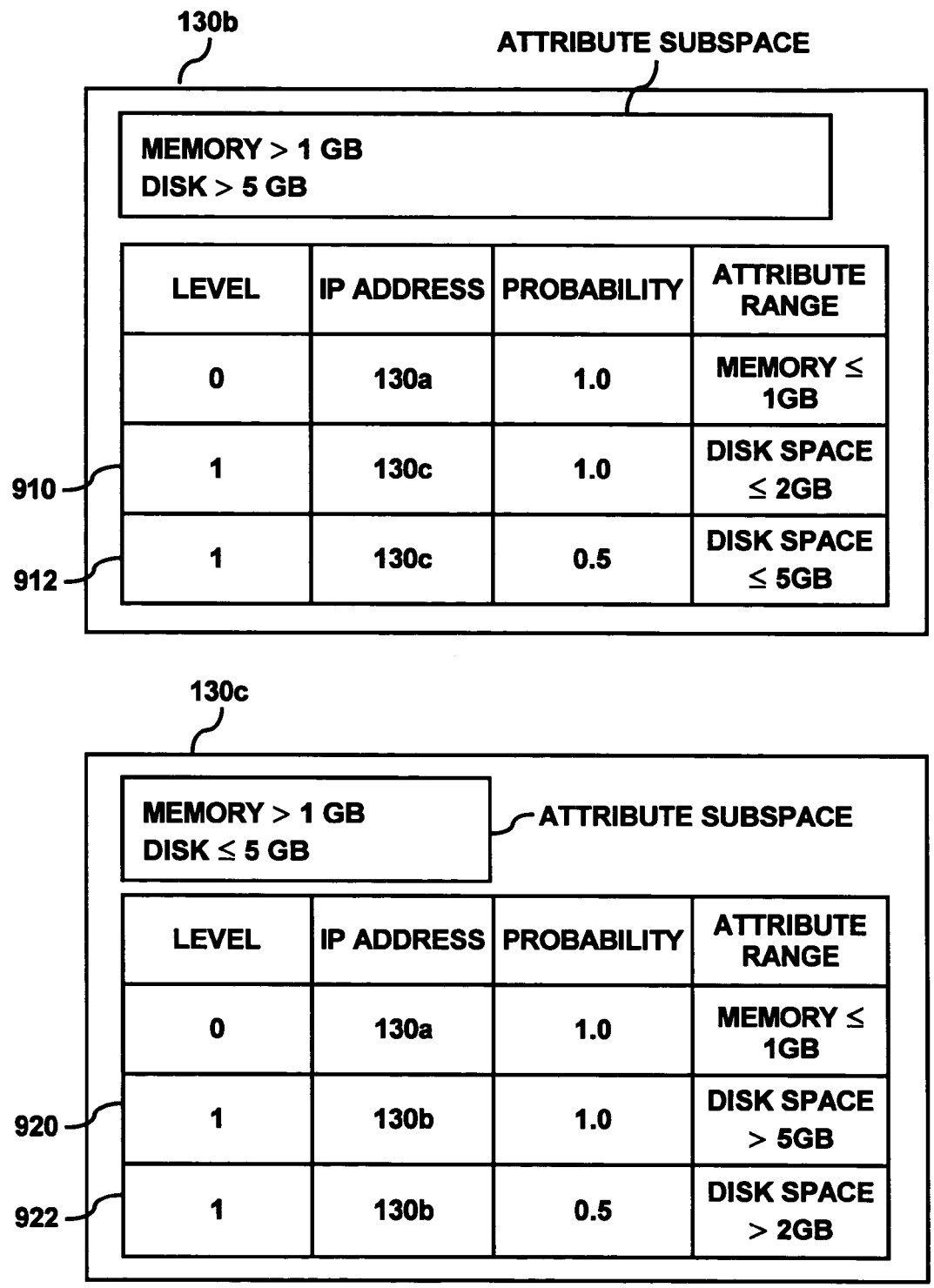

FIGS. 9A-C help show the process by which information service nodes distribute the workload among themselves as new nodes join the overlay network 210. An admission policy may be used to control admission to the overlay network 210. For example, a node may be allowed to join the overlay network 210 if the node has an uptime greater than a threshold, if the node is not transient, and if the node includes predetermined hardware attributes, such as processing speed, disk space, and memory greater than predetermined thresholds.

In this example, initially the information service node 130a was the only node providing the information service, such as the only node storing advertisements and responding to queries. Then, the information service node 130b joins the information service. By applying a local splitting algorithm, the information service node 130a determines that an even distribution of its workload can be achieved if the information service node 130a stores advertisements and responds to queries with memory<=1 GB, i.e., has an attribute subspace memory<=1 GB, and the information service node 130b stores advertisements and responds to queries with memory>1 GB, i.e., has an attribute subspace memory>1 GB. This split in workload is illustrated in FIG. 9A showing the attribute subspaces and the routing tables of the information service nodes 130a and 130b after the split.

The information service node 130c is the next node to join the information service and the overlay network 210 providing the information service, and the workloads of one or more of the information service nodes 130a and 130b should be redistributed. One option is to globally evaluate the workloads of all the information service nodes currently providing the information service, e.g., the information service nodes 130a and 130b. This is achieved by applying a global splitting algorithm which affects all the information service nodes and potentially redistributes the workload of all the information service nodes. Another option is to apply a local splitting algorithm, which splits the workload of a single information service node, every time a new node joins the information service and then perform a global redistribution periodically.

FIG. 9B illustrates a local redistribution of the workload of the information service node 130b. Different types of local splitting algorithms may be used to determine how to split the attribute subspace of the information service node 130b with the information service node 130c. In one example, an iterative clustering algorithm, such as k-means clustering, is used to select an attribute and attribute splitting value based on two clusters found by the clustering algorithm. In another example, a clustering algorithm, such as the same k-means clustering algorithm, is used to determine three clusters, and the three clusters are used to select an attribute and attribute splitting values for splitting the workload of the information service node 130b.

FIG. 9B illustrates the attribute subspaces and the routing tables for the information service nodes 130b and 130c after a clustering algorithm is used to determine three clusters for splitting the workload of the information service node 130b with the information service node 130c.

Assume that disk space is the attribute selected for splitting. Table 4 below illustrates the distribution of advertisements and queries falling in the attribute subspace of the information service node 130b prior to the split with the information service node 130c. This distribution may be determined using the clustering algorithm.

| Table 4 of Workload Distribution For Information Service Node 130b | |
|---|---|
| Disk Space <= 2 GB | 40% |
| 2 < Disk Space <= 5 GB | 20% |
| Disk Space > 5 GB | 40% |

As shown in table 4, the clustering algorithm determines that 80% of the workload for the information service node 130b is associated with one cluster of attribute values for disk space<=2 GB, e.g., 40%, and another cluster of attribute values for disk space>5 GB. e.g., 40%. Together these two clusters cover 80% of the advertisements and queries stored in the information service node 130b prior to the split. Two attribute splitting values are selected based on these clusters. One splitting value is 2 GB.

There is a 100% probability that the information service node 130c, after the split, stores advertisements having a disk space attribute value<=2 GB. This is reflected in the entry 910 for the routing table for the information service node 130b and the attribute subspace for the information service node 130c. Another splitting value is 5 GB. There is a 100% probability that the information service node 130b, after the split, stores advertisements having a disk space attribute value>5 GB. This is reflected in the entry 920 of the information service node 130c and the attribute subspace for the information service node 130b.

A third cluster identified by the clustering algorithm includes the following range: 2 GB>disk space<=5 GB. The clustering algorithm determines that 20% of the workload for the information service node 130b is associated with the third cluster. Either of the information service nodes 130b or 130c may be assigned with some probability to store advertisements and queries falling in the third cluster. Probabilities may be assigned to substantially equalize the rate at which advertisements are received and stored in the information service nodes 130b and 130c. The entries 912 and 922 for the routing tables for the information service nodes 130b and 130c respectively illustrate the probabilities that an advertisement will be found at the information service node listed in the entry. For example, a query with a disk space attribute value greater than 2 GB may be routed to the information service node 130c based on its attribute subspace. If no matches are found, the query is routed to the information service node 130b based on the entry 922 because there is a 50% probability that advertisements with a disk space attribute value greater than 2 GB are stored in the information service node 130b.

After the attribute subspace of the information service node 130b is split with the attribute subspace of the information service node 130c, the information service node 130b sends all the stored advertisements and queries falling in the attribute subspace of the information service node 130c to the information service node 130c. Thus, the information service node 130c is ready to respond to queries falling within its attribute subspace.

FIG. 9C illustrates examples of routing tables and attribute subspaces for the information service nodes 130b and 130d after a splitting algorithm is applied to the information service node 130b for splitting the workload of the information service node 130b with the information service node 130d. In this example, an iterative clustering algorithm, such as k-means clustering, is used to select an attribute and attribute splitting value based on two clusters found by the clustering algorithm. The selected attribute is response time and the splitting value determined from the two clusters is 20 ms. For example, the clustering algorithm determines that for the response time attribute the advertisements and queries stored by the information service node 130b can be divided into two clusters. One cluster includes attribute values<20 ms and the other cluster includes attribute values>=20 ms. Thus, the attribute splitting value of 20 ms is selected and the workload of the information service node 130b is split with the information service node 130d based on the 20 ms splitting value.

As described above, a splitting algorithm may be used to select an attribute and a splitting value for splitting the workload of an information service node. One example of a splitting algorithm is the k-means clustering algorithm that identifies two clusters for determining the attribute and splitting value. The k-means clustering algorithm is a known algorithm used to group a population of data into a predetermined number of clusters. For example, if two clusters are selected, then each data point in the population is randomly assigned to one of the two clusters such that approximately the same number of data points is in each cluster. Then, each data point in each cluster is evaluated to determine which cluster it belongs to based on a minimum distance to a cluster. For example, clustering is performed for the memory attribute at the information service node 130b. The information service node 130b determines the memory attribute values for all the advertisements stored therein. Two clusters are selected with centers at 1 GB and 5 GB respectively.

Each attribute value is evaluated to determine which cluster it belongs to based on a minimum distance to a cluster For example, a 0.25 GB attribute value is closer to 1 GB than 5 GB, and thus the 0.25 GB attribute value is assigned to the 1 GB cluster. A 4 GB attribute value is closer to 5 GB and is assigned to the 5 GB cluster. This evaluation is performed until a determination is made that none of the data points need to be reassigned to a different cluster.

Determining two clusters is performed for each attribute in the predetermined set of attributes having a numeric value. For example, table 3 shows an example of an advertisement including attribute values for each of the attributes in the set. Clustering is performed for each of the attributes except for the application attribute, because the application attribute values are not numeric.

After applying the k-means clustering algorithm to determine two clusters for each attribute, at least one optimization criterion is used to select one of the attributes for splitting. Then, a splitting value is determined for the selected attribute based on the clusters. An example of the optimization criterion may include the attribute for which clustering leads to a minimum difference in size between the two clusters. Another example may include normalizing each set of attribute values in each cluster to a value in the range of 0 to 1, and then selecting an attribute with the minimum-squared error where k-means clustering converges. Other optimization metrics may be used to evaluate the clusters for each attribute, such that an attribute is selected having clusters that allow for optimally splitting workload of an information service node.

After the attribute is selected, the splitting value is determined based on the clusters for the selected attribute. For example, M1 and M2 are the means of the attribute values in each of clusters C1 and C2, respectively, such that M1<M2. Let Max(C1) be the maximum attribute value for C1, while Min(C2) is the minimum attribute value for C2. The splitting value is equal to (Max(C1)+Min (C2))/2.

The k-means clustering algorithm may also be used to determine three clusters for identifying an attribute and splitting values for splitting the workload of an information service node. The k-means clustering algorithm is used to determine three clusters for each attribute in the predetermined set of attributes having a numeric value. After applying the k-means clustering algorithm to determine three clusters for each attribute, at least one optimization criterion is used to select one of the attributes for splitting. Then, a splitting value is determined for the selected attribute based on the clusters. The optimization criterion described above may be used.

After the attribute is selected, splitting values are determined based on the clusters for the selected attribute. For example, M1, M2 and M3 are the means of the attribute values in each of clusters C1, C2 and C3, respectively, such that M1<M2<M3. The advertisements for the cluster C1 are assigned to one of the information service nodes, such as the information service node 130c, and the advertisements for the cluster C3 are assigned to the other information service node, such as the information service node 130b. The advertisements for the third cluster C2 are assigned to one of the information service nodes 130c or 130b based on a probability. To ensure uniform distribution of workload between the two information service nodes, the probabilities P and (1−P) which an advertisement from the cluster C2 is assigned to one the information service nodes 130b or 130c is determined. The value of P is given by: Size(C1)+P*Size(C2)= (1−P)*Size(C2)+Size(C3). The two splitting values, such as 2 GB and 5 GB shown in FIG. 9B, are the Max(C1) and Min (C3).

The k-means clustering algorithm is one type of clustering algorithm that is used to select an attribute and determine one or more attribute splitting values. Other types of clustering algorithms, such as entity means clustering, or other types of statistical analysis may be used to determine the similarity between data, such as attribute values for an attribute for each advertisement, and to group similar data to split workload.

The local splitting algorithms described above are used to split the workload of one information service node, which may be one of the information service nodes having the highest or one of the highest workloads in the top K list, with another information service node, such as a new information service node joining the overlay network 210. Another option is to globally evaluate the workloads of all the information service nodes in the overlay network and possibly reassign the workloads for all the information service nodes for balancing the workloads of the information service nodes 130. This is achieved by applying a global splitting algorithm which affects all the information service nodes and potentially redistributes the workload of all the information service nodes.

A global splitting algorithm may be used to balance workloads of a large number of information service nodes or all the information service nodes rather than an individual information service node and also to improve latency in the overlay network 210. For example, if a local splitting algorithm is applied to many information service nodes in one area of the overlay network 210, the workloads of the information service nodes in that area may be better balanced. However, the latency in the overlay network 210 may be increased, because it may take more hops to reach a final destination in the overlay network 210, such as an information service node owning the attribute subspace where an advertisement falls. The global splitting algorithm may be used to balance the workloads of all the information service nodes 130 in the overlay network 210 and minimize latency. The global splitting algorithm may be applied periodically and may be applied at times when processing in the information service is historically low to minimize disruption to the information service.

The global evaluation of all the information service nodes starts with each information service node summarizing all the advertisements received by a respective information service node during a period of time. An example of a summary may include a histogram, such as 20% of the advertisements received during the last 24 hours have memory between 4 and 5 GB, 20% have memory between 0.5 and 1 GB, etc. A histogram may be provided for each attribute. Summaries may be provided in forms other than a histogram.

Figure 10:
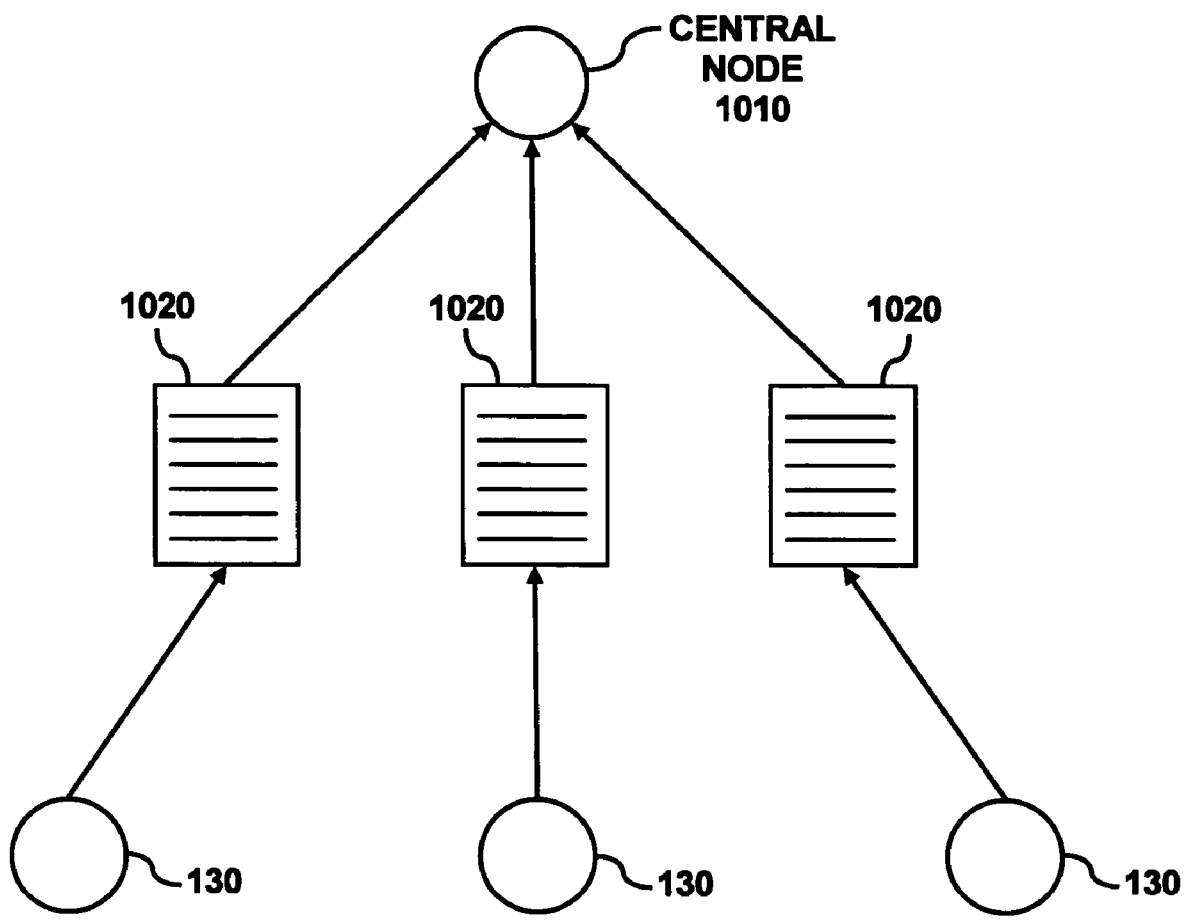
FIG. 10 illustrates information service nodes in the beginning phase of the global splitting algorithm, according to an embodiment.

FIG. 10 illustrates the information service nodes 130 in the beginning phase of the global splitting algorithm. FIG. 10 illustrates the information service nodes 130 transmitting summaries 1020 to a central node 1010. The central node 1010 may be one of the information service nodes 130. In another example, the central node 1010 may include a plurality of information service nodes, each assigned to receive summaries from information service nodes, for example, in close proximity. In this example, the plurality of central nodes communicate with each other to apply the global splitting algorithm.

Figure 11A:
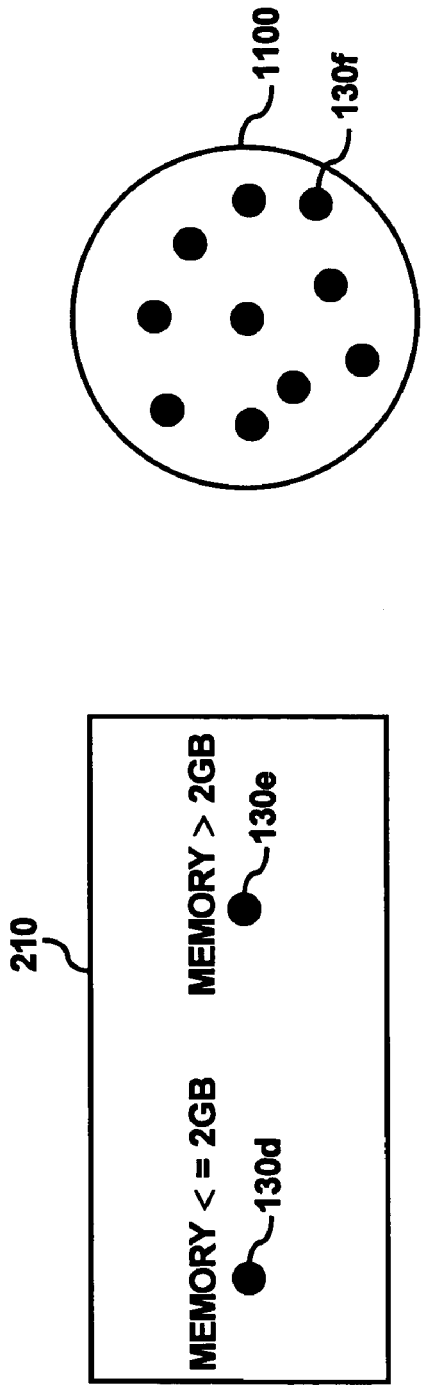
FIGS. 11A-B illustrate examples of applying a global splitting algorithm, according to an embodiment.
Figure 11B:
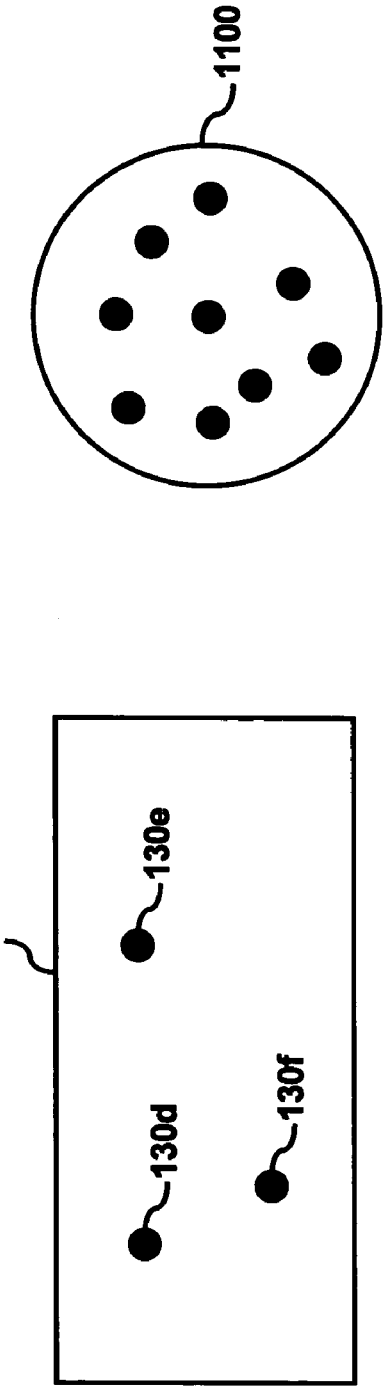

The central node 1010 applies a splitting algorithm on the entire input of summaries from each information service node. The splitting algorithm may include one of the local splitting algorithms described above. For example, a clustering algorithm, such as the k-means clustering algorithm, may be used to identify two clusters for each attribute from the summaries from the information service nodes. An attribute and a splitting value are selected based on the calculated clusters. For example, as shown in FIG. 11A, the memory attribute may be selected and the splitting value may be 2 GB. Then, two information service nodes 130*d* and 130*a* are selected from the set of information service nodes 1100 providing summaries. The information service nodes 130*d* and 130*a* are assigned an attribute subspace based on the splitting value. For example, the information service node 130*d* is assigned an attribute subspace of memory<=2 GB and the information service node 130*a* is assigned an attribute subspace of memory>2 GB and routing tables are created for each of the two information service nodes. Then, the information service node with the largest cluster is split. For example, if more advertisements have memory>2 GB than memory<=2 GB, such as determined from the summaries 1020 shown in FIG. 10, then the cluster of advertisements having memory>2 GB for the information service node 130*a* is split with another information service node. FIG. 11B shows the information service node 130*f* selected to split the workload of the information service node 130*a*. This process is repeated until all the information service nodes are assigned an attribute subspace in the overlay network 210. In one example, the information service nodes maybe arbitrarily selected from the set 1100 each time a cluster is split.

After all the nodes in the set 100 have been assigned a new attribute subspace and have generated a new routing table, the advertisements are transmitted to the information service node having the attribute subspace where each advertisement falls. For example, each information service node transmits the advertisements stored in its global cache to the information service node that has been reassigned the corresponding attribute subspace. Alternatively, each of the information service nodes 130 may empty their global caches and wait for the next reporting of advertisements from the service node 120 to the overlay network 210. For example, the service nodes 120 shown in FIGS. 1 and 2 may periodically transmit advertisements to the overlay network 210, and thus the information service nodes 130 may wait for the next reporting to store advertisements associated with respective attribute subspaces.

Instead of using the two-cluster local splitting algorithm described above, the global splitting algorithm may apply the three-cluster local splitting algorithm, where a probability is determined for the third cluster. The three-cluster local splitting algorithm is applied until the set of information service nodes providing summaries is exhausted. Then, the global caches are re-populated based on the newly-assigned attribute subspaces.

Figure 12:
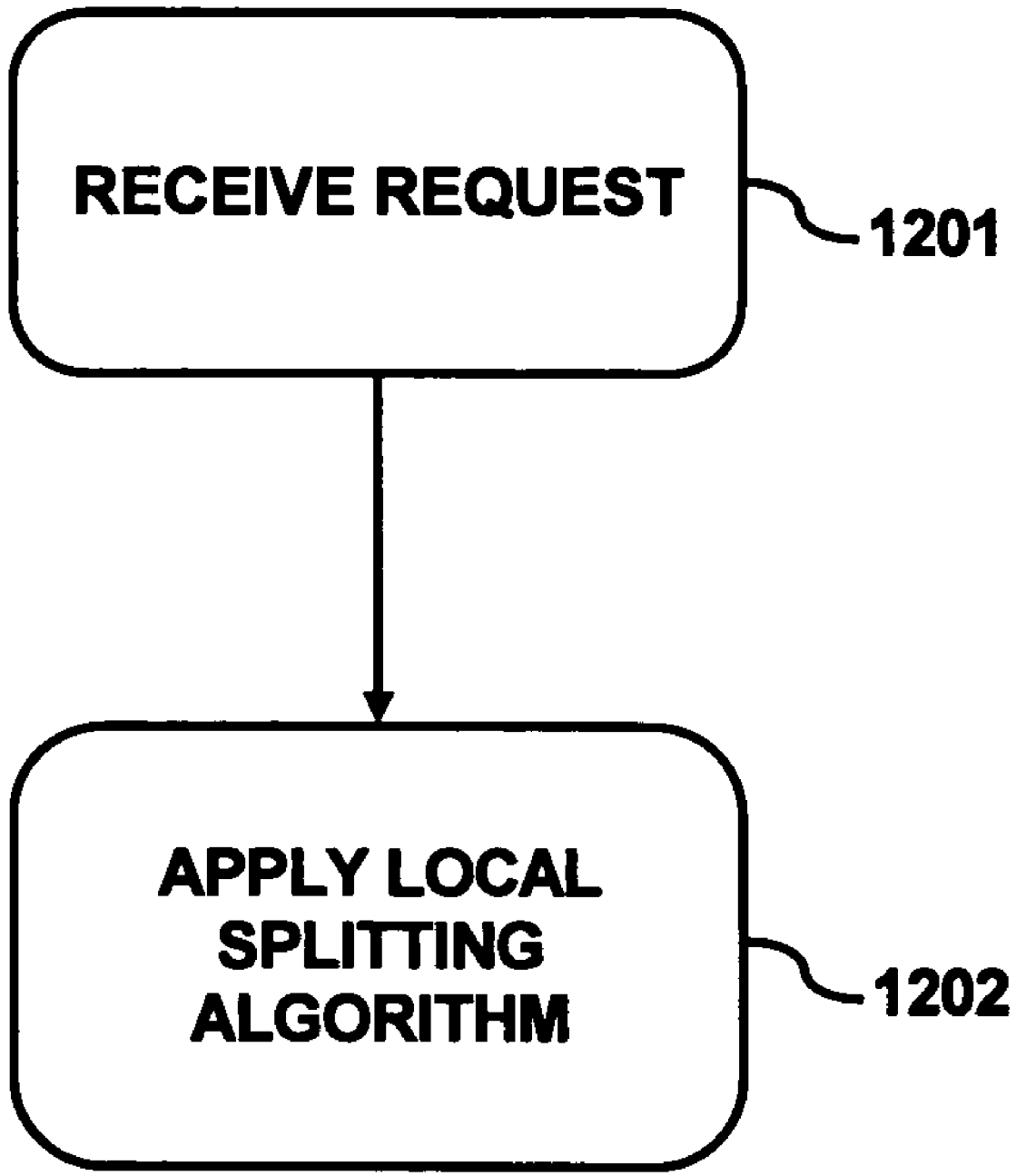
FIG. 12 illustrates a flowchart of a method for applying a local splitting algorithm, according to an embodiment.

FIG. 12 illustrates a flowchart of a method 1200 for applying a local splitting algorithm, according to an embodiment. At step 1201, an information service node in the overlay network 210, such as the information service node 130*b*, receives a request. The request may be a join request or any message that invokes the splitting of the workload of the information service node 130*b*. For example, the information service node 130*b* may be the information service node having the highest workload in the top K list or one of the highest workloads in the top K list. The maximum routing table level in the overlay network 210, which may be provided in the K min level list described above with respect to FIG. 7, and the highest routing table level of a selected information service node, which also which may be provided in the K min level list, can also be considered when selecting an information service node for splitting. For example, the information service node 130*c* transmits a join request to the overlay network 210. The join request may be transmitted to an information service node, such as the information service node 130*e*, determined to be in close network proximity to the information service node 130*c*. The information service node 130*e* selects the information service node 130*b* in the top K list having the highest workload. The information service node 130*e* also compares the highest routing table level of the information service node 130*b* to the maximum routing table level of the overlay network 210. If the difference between the routing table levels is greater than a threshold, then another information service node may be selected for splitting. The another information service node may be another information service node from the top K list. By utilizing this routing table level comparison, an unbalanced service tree caused by excessive splitting in one area of the service tree is minimized.

At 1202, the information service node 130*b* applies a local splitting algorithm to split the workload of the information service node 130*b* if the information service node 130*b* is selected at step 1201. For example, the information service node 130*b* applies one of the local splitting algorithms described above to select an attribute and at least one attribute splitting value for splitting the workload of the information service node 130*b* with the information service node 130*c*.

Figure 13:
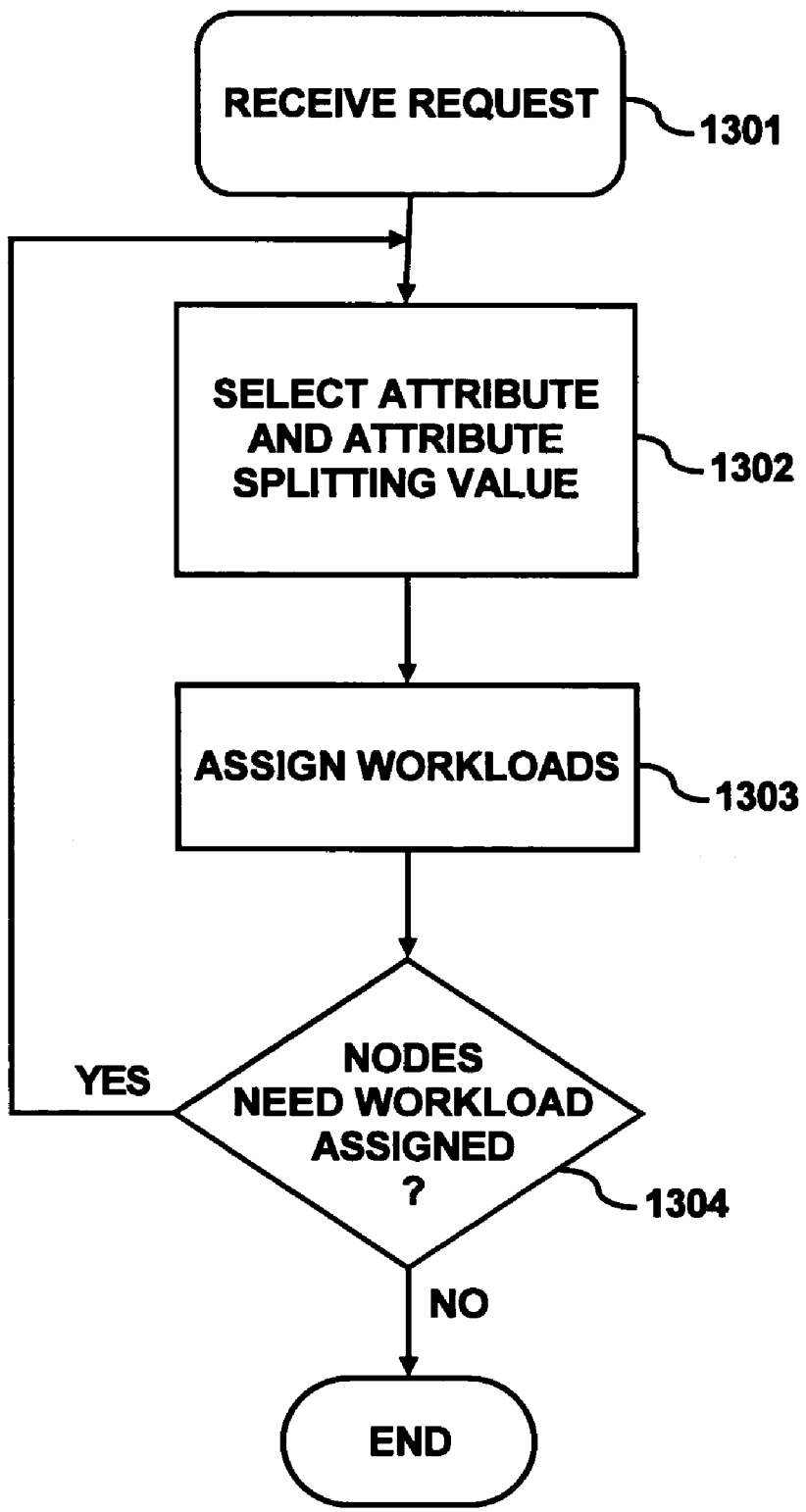
FIG. 13 illustrates a flowchart of a method for applying a global splitting algorithm, according to an embodiment.

FIG. 13 illustrates a flowchart of a method 1300 for applying a global splitting algorithm, according to an embodiment. The method 1300 is described with respect to the FIGS. 10 and 11A-B by way of example and not limitation. At step 1301, the central node 1010 receives the summaries 1030 from the information service nodes 130.

At step 1302, the central node 1010 selects an attribute and at least one attribute splitting value based on a statistical analysis of the summaries. The statistical analysis may include the application of one of the local splitting algorithms described above to the summaries 1030.

At step 1303, the central node 1010 assigns workloads to two nodes, e.g., the information service nodes 130*d* and 130*a*, from the set of information service nodes 1100 shown in FIG. 11 as if the two nodes are the only information service nodes in the overlay network 210. The assigned workloads are based on the at least one splitting value.

At step 1304, the central node 1010 determines whether all the information services nodes in the set 1100 have been assigned workloads. If not, the steps 1302 and 1303 are repeated.

6. Replica Assignment

According to an embodiment, when a new node is available to join the overlay network 210, a join request is forwarded, for example, to the information service node in the top K list having the highest workload. Then, that information service node splits its workload with the new node based on the application of a local splitting algorithm. In certain situations, rather than splitting the workload of an information service node, it may be more beneficial to replicate an existing information service node in another area of the network 100 shown in FIGS. 1 and 2 to reduce latency between the user nodes requesting information for particular services and the information service nodes storing the advertisements relevant to the requests. For example, an information service node may be duplicated at a new location in the network 100 if it is determined that user nodes are experiencing high latencies from the information service node processing queries and sending results to the user nodes.

In one example, an information service node may be replicated instead of splitting the workload of an information service node if the workloads in the top K list are below a threshold. Then, it may be assumed that it is more beneficial to replicate an information service node to reduce latency rather than reducing the workload of an information service node.

Figure 14:
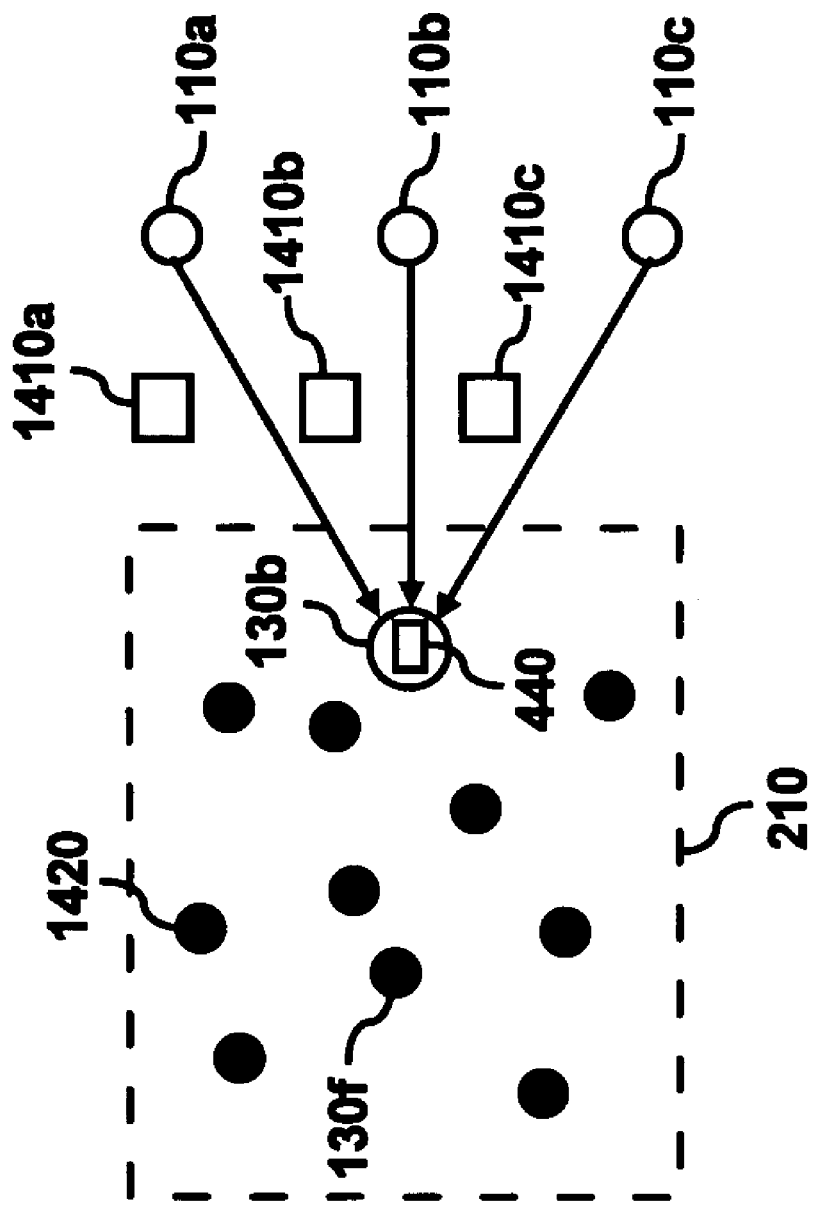
FIG. 14 illustrates an example of using latency reports to select an information service node for replication.

A particular information service node may be replicated if latency between the information service node and a user node is greater than a threshold. Latencies may be stored in a replica information cache for each information service node. The replica location cache 440, shown in FIG. 4, for the information service node 130b stores information associated with the latencies of certain information service nodes. The information service node 130b may use the information in the replica location cache 440 to determine whether to add a replica in another area of the network 100 to reduce latency. For example, FIG. 14 illustrates the information service node 130b receiving latency reports 1410a-c from user nodes 110a-c in close proximity to the information service node 130b. The information service node 130b may be the information service node that the user nodes 110a-c initially contact when sending queries to the overlay network 210. The reports 1410a-c include latencies from information service nodes processing queries and sending query results to the user nodes 110a-c. The reports 1410a-c also include the identification of a corresponding information service node with each latency. Latencies and information service node identifications are stored in the replica location cache 440. The information service node 130b receives a join request from the node 1420. The information service node 130b determines whether the workloads in the top K list are below a threshold. If the workloads are below a threshold, then the information service node 130b selects an information service node from the replica location cache having a high latency. In one example, an information service node identified from the replica location cache 440 that has a latency greater than a threshold is selected for replication, such as the information service node 130f. The information service node 130f is replicated, which may include copying global caches and storing the advertisements in the new information service node 1420 that is a replica. Network proximity information, such as distances between nodes, may be based on a network metric, such as round trip time, number of hops, etc.

Figure 15:
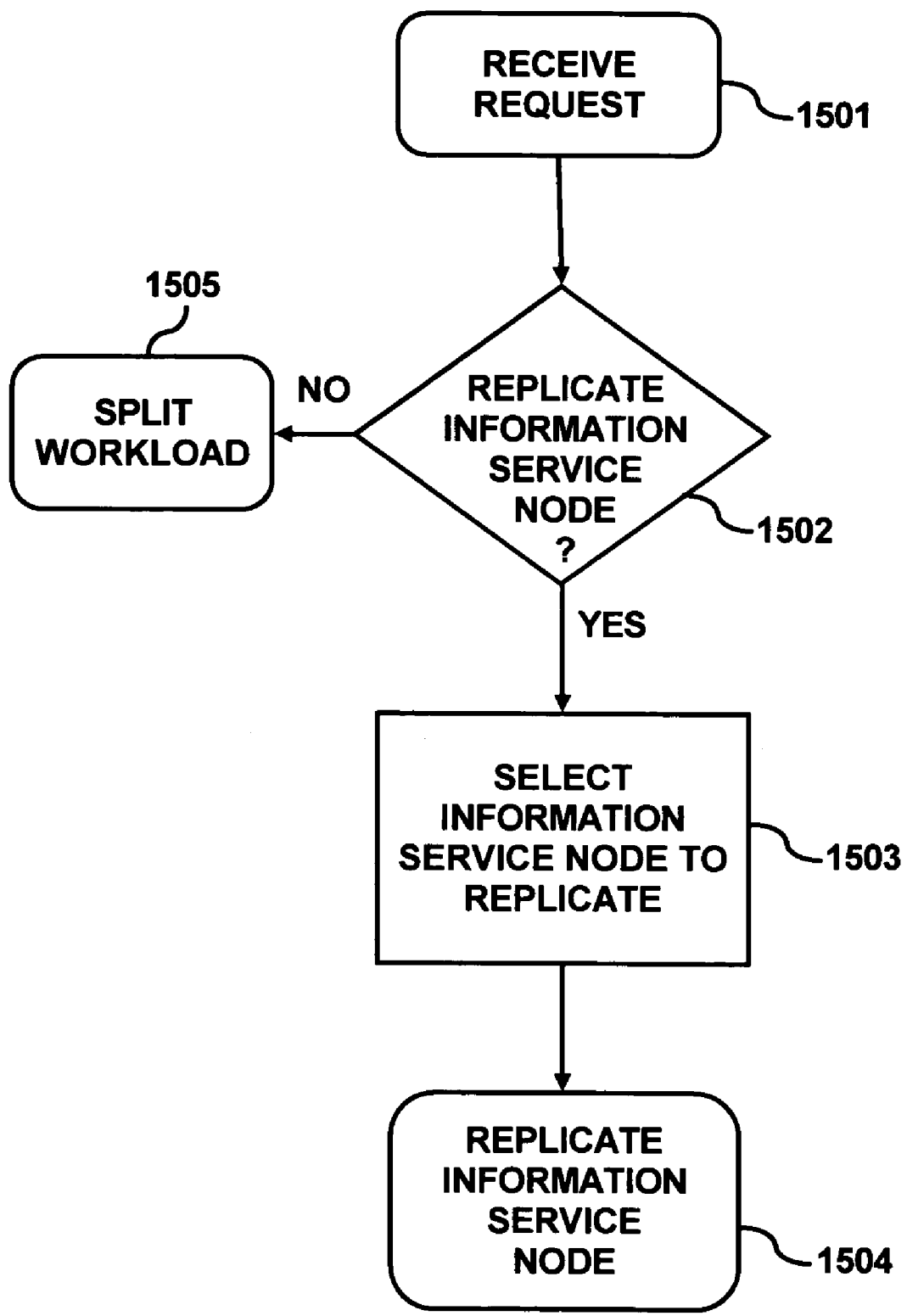
FIG. 15 illustrates a flowchart of a method for replicating an information service node, according to an embodiment.

FIG. 15 illustrates a flowchart of a method 1400 for replicating an information service node, according to an embodiment. The method 1400 is described with respect to the example shown in FIG. 14 by way of example and not limitation. At step 1501, the information service node 130b receives a request, such as a join request, from the node 1420 prompting a workload split or replication.

At step 1502, the information service node 130b determines whether to replicate an information service node or split the workload of an information service node. In one example, an information service node may be replicated instead of splitting the workload of an information service node if the workloads in the top K list are below a threshold.

At step 1503, if the information service node 130b determines to replicate an information service node, the information service node 130b selects an information service node to be replicated. Factors considered when selecting an information service node for replication include latency of an information service node and distance between the node 1420 and the user node. With regard to distance, for example, a new node is selected to be a replica that is in the same network proximity to the user node having the high latency and the information service node 130b if the information service node 130b is the node receiving reports from the user node.

At step 1504, the selected information service node is replicated. For example, the global caches and routing table of the information service node 130f are copied to the node 1420.

Figure 16:
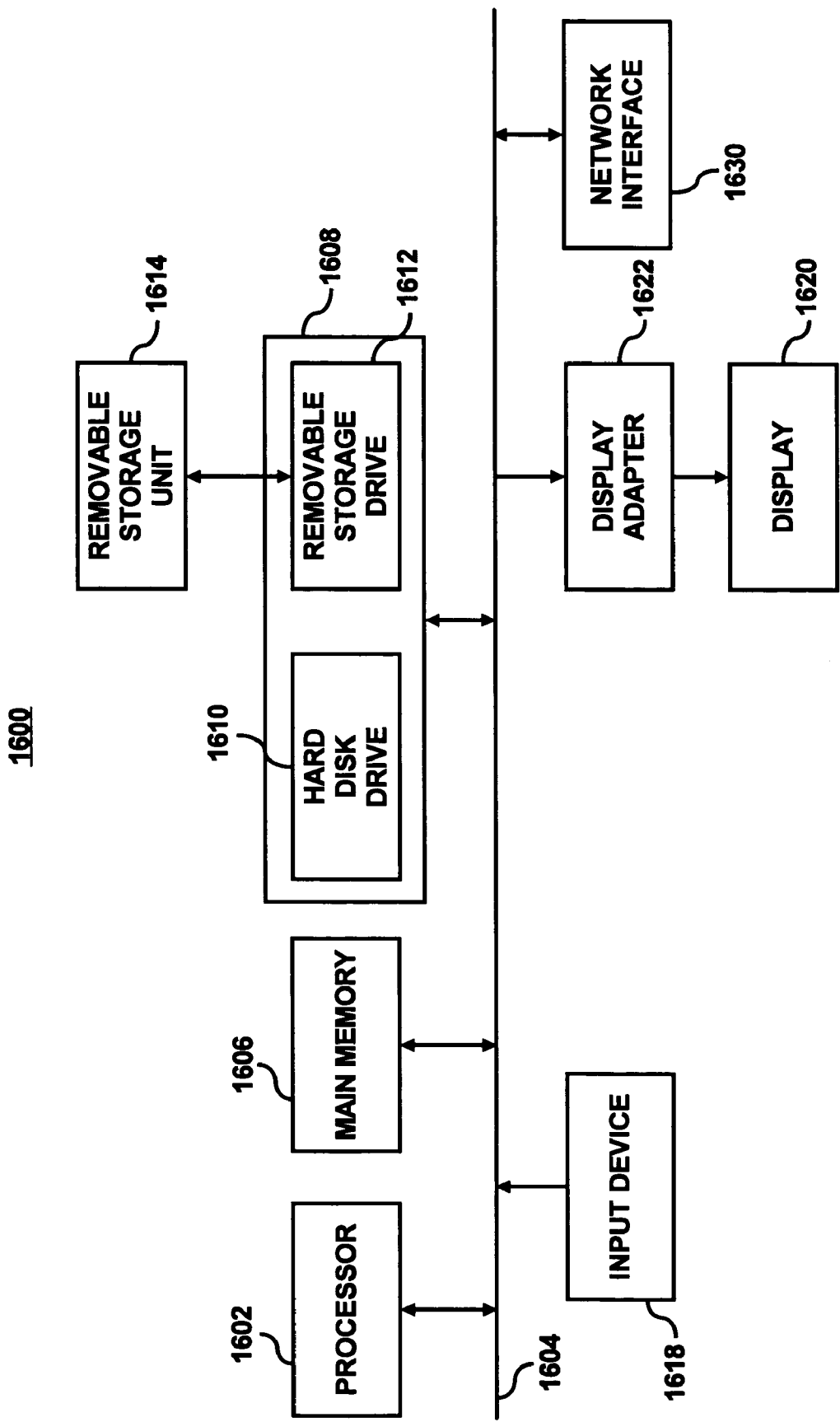
FIG. 16 illustrates a computer system, according to an embodiment.

FIG. 16 illustrates an exemplary block diagram of a computer system 1600 that may be used as an information service node in the overlay network 210. The computer system 1600 includes one or more processors, such as processor 1602, providing an execution platform for executing software.

Commands and data from the processor 1602 are communicated over a communication bus 1604. The computer system 1600 also includes a main memory 1606, such as a Random Access Memory (RAM), where software may be resident during runtime, and a secondary memory 1608. The secondary memory 1608 includes, for example, a hard disk drive 1610 and/or a removable storage drive 1612, representing a floppy diskette drive, a magnetic tape drive, a compact disk drive, etc., or a nonvolatile memory where a copy of the software may be stored. The secondary memory 1608 may also include ROM (read only memory), EPROM (erasable, programmable ROM), EEPROM (electrically erasable, programmable ROM). In addition to software, routing tables, the global information table, and measured QoS characteristics, measured available bandwidth and bandwidth required for services may be stored in the main memory 1606 and/or the secondary memory 1608. The removable storage drive 1612 reads from and/or writes to a removable storage unit 1614 in a well-known manner.

A user interfaces with the computer system 1600 with one or more input devices 1628, such as a keyboard, a mouse, a stylus, and the like. The display adaptor 1622 interfaces with the communication bus 1604 and the display 1620 and receives display data from the processor 1602 and converts the display data into display commands for the display 1620. A network interface 1630 is provided for communicating with other nodes.

One or more of the steps of the methods 1200, 1300 and 1500 may be implemented as software embedded on a computer readable medium, such as the memory 1606 and/or 1608, and executed on the computer system 1600, for example, by the processor 1602. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method of splitting a workload of a node of a plurality of nodes in a peer-to-peer net-work, and the plurality of nodes in the peer-to-peer network are information service nodes operable to store information for services provided by service nodes different from the information service nodes in the peer-to-peer network, the method comprising:
   receiving a request at the node having a workload determined to be in a set of highest workloads for the plurality of nodes in a peer-to-peer network; and
   splitting the workload of the node with a second node of the plurality of nodes in the peer-to-peer network using a splitting algorithm,
   wherein each of the information service nodes is responsible for a different attribute subspace, each attribute subspace being associated with an attribute and range of attribute values describing at least one of the services, and each information service node stores information for a service of the services if an attribute value describing the service is in the range of attribute values for the attribute subspace of the information service node.

2. The method of claim 1, wherein splitting the workload of the node further comprises:
   determining an attribute and at least one attribute splitting value using the splitting algorithm; and
   splitting the workload of the node based on the attribute and the at least one attribute splitting value.

3. The method of claim 2, wherein splitting the workload of the node further comprises:
   determining two ranges of attribute values for the attribute, wherein a first range includes attribute values below the at least one attribute splitting value and a second range includes attribute values above the at least one attribute splitting value;
   assigning the node to store information about services having an attribute value in one of the two ranges; and
   assigning the second node to store information about services having an attribute value in the other of the two ranges.

4. The method of claim 3, wherein splitting the workload of the node further comprises:
   transmitting information for services from the node to the second node, wherein the transmitted information includes information for services having attribute values in the range assigned to the second node.

5. The method of claim 3, wherein splitting the workload of the node further comprises:
   generating a routing table for the second node using a routing table for the node, wherein the routing table for the second node includes a highest level entry associated with a highest level entry for the node.

6. The method of claim 3, wherein the splitting algorithm comprises a clustering algorithm and selecting an attribute and at least one attribute splitting value using the splitting algorithm further comprises:
   determining at least two clusters from data stored at the node using the clustering algorithm; and
   selecting the attribute and an attribute splitting value based on the at least two clusters.

7. The method of claim 3, wherein determining at least two clusters further comprises:
   determining at least two clusters for each of the attributes having corresponding numeric attribute values.

8. The method of claim 7, wherein selecting the attribute and an attribute splitting value based on the at least two clusters further comprises:
   evaluating the clusters for each of the attributes using at least one optimization criterion;
   selecting one of the attributes based on the evaluation; and
   determining the attribute splitting value using the clusters for the selected one of the attributes.

9. The method of claim 3, wherein the splitting algorithm comprises a clustering algorithm and selecting an attribute and at least one attribute splitting value using the splitting algorithm further comprises:
   determining three clusters from data stored at the node using the clustering algorithm; and
   selecting the attribute and two attribute splitting values based on the three clusters.

10. The method of claim 9, wherein splitting the workload of the node further comprises:
    determining three ranges of attribute values for the selected attribute based on the two attribute splitting values;
    assigning the node to store information about services having attribute values in one of the three ranges;
    assigning the second node to store information about services having attribute values in a second of the three ranges; and
    assigning both the node and the second node to store information about services having attribute values in a third of the three ranges.

11. The method of claim 10, wherein assigning both the node and the second node to store information about services having attribute values in a third of the three ranges further comprises:
    assigning probabilities that the node and the second node store information about services having attribute values in the third of the three ranges.

12. The method of claim 11, further comprising:
    selecting the probabilities to substantially equalize workloads of the node and the second node.

13. The method of claim 11, further comprising:
    generating a routing table for the second node using a routing table for the node, wherein the routing table for the second node includes a first entry for the node and a second entry for the node with the probability assigned to the node; and
    updating the routing table for the node to include a first for the second node and a second entry for the second node with the probability assigned to the second node.

14. The method of claim 1, further comprising:
    determining whether a difference between a maximum routing table level in the peer-to-peer network and a minimum value in a min level vector is greater than a threshold; and selecting a node having the minimum value for splitting in response to the difference being greater than the threshold.

15. A method of splitting a workload of an information service node in a peer-to-peer, overlay network including a plurality of information service nodes, wherein the plurality of information service nodes are operable to store information for services available in the network and provided by service nodes different from the information service nodes and the information service nodes are further operable to respond to queries about the available services, the method comprising:

determining, at an information service node, a top K list of information service nodes from the plurality of information service nodes in the overlay network having highest workloads, where K is a number of information service nodes in the list;

identifying a top K information service node having a highest workload from the top K list; and splitting the workload of the top K information service node with another information service node in the overlay network, wherein each of the information service nodes in the top K list is responsible for a different attribute subspace, each attribute subspace being associated with an attribute and range of attribute values for describing at least one of the services, and each information node service stores information for a service of the services if an attribute value describing the service is in the range of attribute values for the attribute subspace of the information service node.

16. The method of claim 15, wherein splitting the workload further comprises:

selecting an attribute from a plurality of attribute values, wherein the plurality of attributes are attributes of the available services;

determining an attribute splitting value for the selected attribute; and splitting the workload of the top K information service node based on the attribute splitting value.

17. The method of claim 16, wherein selecting an attribute from a plurality of attribute values, wherein the plurality of attributes are attributes of the available services further comprises:

determining at least two clusters for each of the attributes having corresponding numeric attribute values stored at the top K node;

evaluating the clusters for each of the attributes using at least one optimization criterion; and selecting one of the attributes based on the evaluation.

18. The method of claim 17, wherein selecting an attribute from a plurality of attribute values, wherein the plurality of attributes are attributes of the available services further comprises:

determining the attribute splitting value using the clusters for the selected one of the attributes.

19. The method of claim 15, wherein splitting the workload further comprises:

determining two clusters of data from attribute values for services stored in the top K information service node using a clustering algorithm; and splitting the workload of the top K information service node based on the two clusters.

20. The method of claim 19, wherein splitting the workload further comprises:

determining three clusters of data from attribute values for services stored in the top K information service node using a clustering algorithm; and splitting the workload of the top K information service node based on the three clusters.

21. The method of claim 20, wherein splitting the workload further comprises:

assigning a first range of attribute values based on a first of the three clusters to the top K information service node;

assigning a second range of attribute values based on a second of the three clusters to the another information service node; and assigning probabilities that the top K information service node and the another information service node store information about services having attribute values in a third of range of attribute values associated with a third of the three clusters, wherein the probabilities are selected to substantially equalize workloads of the top K information service node and the another information service node.

22. The method of claim 15, wherein identifying a top K information service node having a highest workload from the top K list further comprises:

determining whether a difference between a maximum routing table level in the peer-to-peer network and a minimum value in a mm level vector is greater than a threshold; and selecting an information service node having the minimum value for splitting in response to the difference being greater than the threshold.

23. A node in a peer-to-peer network comprising:

means for identifying a node from a set of highest workloads for nodes in a peer-to-peer network; and means for applying a splitting algorithm to split the workload of the identified node with a second node in the peer-to-peer network, wherein the node is a node of a plurality of information service nodes in the peer-to-peer network operable to store information for services provided by service nodes different from the information service nodes in the peer-to-peer network, and each of the information service nodes is responsible for a different attribute subspace, each attribute subspace being associated with an attribute and range of attribute values describing at least one of the services, and each information service node stores information for a service of the services if an attribute value describing the service is in the range of attribute values for the attribute subspace of the information service node.

24. The node of claim 23, further comprising:

means for updating a routing table in the node to include a highest level entry for the second node based on splitting the workload.

25. The node of claim 23, wherein the node further comprises:

means for transmitting information about services from the node to the second node, wherein the information includes information associated with the new workload of the second node.

26. The node of claim 23, wherein the splitting algorithm comprises a clustering algorithm used to determine at least two clusters.

27. Computer software embedded on a computer readable medium and executed by a processor to perform a method of splitting a workload of a node of a plurality of nodes in a peer-to-peer network, and the plurality of nodes in the peer-to-peer network are information service nodes operable to store information for services provided by service nodes different from the information service nodes in the peer-to-peer network, the method comprising:

identifying a node from a set of highest workloads for nodes in a peer-to-peer network; and applying a splitting algorithm to split the workload of the identified node with a second node in the peer-to-peer network, wherein each of the information service nodes is responsible for a different attribute subspace, each attribute subspace being associated with an attribute and range of attribute values describing at least one of the services, and each information service node stores information for a service of the services if an attribute value describing the service is in the range of attribute values for the attribute sub space of the information service node.

28. The computer software embedded on the computer readable medium of claim 27, wherein, the method further comprises:

determining an attribute and at least one attribute splitting value using the splitting algorithm; and splitting the workload of the node based on the attribute and the at least one attribute splitting value.

29. The computer software embedded on the computer readable medium of claim 28 wherein determining an attribute and at least one attribute splitting value using the splitting algorithm further comprises:

determining at least two clusters from data stored at the node using a clustering algorithm; and selecting the attribute and the at least one attribute splitting value based on the at least two clusters.

* * * * *

UNITED STATES PATENT AND TRADEMARK OFFICE
CERTIFICATE OF CORRECTION

| | | |
|---|---|---|
| PATENT NO. | : 7,596,618 B2 | Page 1 of 1 |
| APPLICATION NO. | : 11/006061 | |
| DATED | : September 29, 2009 | |
| INVENTOR(S) | : Sujoy Basu et al. | |

It is certified that error appears in the above-identified patent and that said Letters Patent is hereby corrected as shown below:

In column 23, line 21, in Claim 1, delete "net-work" and insert -- network --, therefor.

In column 25, line 9, in Claim 15, delete "nodes" and insert -- nodes, --, therefor, In column 26, line 26, in Claim 22, delete "mm" and insert -- min --, therefor.

In column 27, line 17, in Claim 27, delete "sub space" and insert -- subspace --, therefor.

In column 28, line 2, in Claim 28, delete "wherein," and insert -- wherein --, therefor.

Signed and Sealed this
Twentieth Day of December, 2011

David J. Kappos
*Director of the United States Patent and Trademark Office*